US009215063B2

(12) United States Patent
Wiley et al.

(10) Patent No.: US 9,215,063 B2
(45) Date of Patent: Dec. 15, 2015

(54) SPECIFYING A 3-PHASE OR N-PHASE EYE PATTERN

(71) Applicant: QUALCOMM Incorporated, San Diego, CA (US)

(72) Inventors: George Alan Wiley, San Diego, CA (US); Chulkyu Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 7 days.

(21) Appl. No.: 14/507,702

(22) Filed: Oct. 6, 2014

(65) Prior Publication Data

US 2015/0098538 A1 Apr. 9, 2015

Related U.S. Application Data

(60) Provisional application No. 61/888,611, filed on Oct. 9, 2013.

(51) Int. Cl.
*H04L 7/04* (2006.01)
*H04L 1/20* (2006.01)
*H04L 1/24* (2006.01)
*H04L 25/49* (2006.01)
*H04L 25/02* (2006.01)
*H04L 5/20* (2006.01)

(52) U.S. Cl.
CPC .............. *H04L 7/042* (2013.01); *H04L 1/205* (2013.01); *H04L 1/206* (2013.01); *H04L 1/247* (2013.01); *H04L 5/20* (2013.01); *H04L 25/0272* (2013.01); *H04L 25/0282* (2013.01); *H04L 25/0294* (2013.01); *H04L 25/0298* (2013.01); *H04L 25/4917* (2013.01)

(58) Field of Classification Search
CPC ... H04L 5/20; H04L 25/0272; H04L 25/0298; H04L 25/4917; H04L 25/0294; H04L 25/0282; H04L 7/042; H04L 1/205; H04L 1/206; H04L 1/247
See application file for complete search history.

(56) References Cited

U.S. PATENT DOCUMENTS

| 5,703,914 | A | * | 12/1997 | Nakamura | ................. 375/355 |
| 6,493,868 | B1 | | 12/2002 | DaSilva et al. | |
| 2003/0196154 | A1 | | 10/2003 | Grandi et al. | |
| 2004/0131113 | A1 | | 7/2004 | Rao | |
| 2008/0212709 | A1 | * | 9/2008 | Wiley | ................ H04L 5/20 375/286 |
| 2009/0225873 | A1 | * | 9/2009 | Lee | ................ H04L 25/49 375/257 |
| 2010/0223413 | A1 | * | 9/2010 | Liu | ................. 710/305 |

(Continued)

OTHER PUBLICATIONS

International Search Report and Written Opinion—PCT/US2014/059548—ISA/EPO—Apr. 2, 2015.

(Continued)

*Primary Examiner* — Daniel Washburn
*Assistant Examiner* — Eboni Hughes
(74) *Attorney, Agent, or Firm* — Loza & Loza, LLP

(57) ABSTRACT

System, methods and apparatus are described that facilitate tests and measurements related to multi-wire, multi-phase communications links. Information is transmitted in N-phase polarity encoded symbols and an eye pattern corresponding to the symbols may be generated such that the symbols are aligned with a trigger for each symbol that corresponds to a clock edge used to sample the symbols. The eye pattern may be used to determine sufficiency of setup times in the communication links and other such characteristics defining a communications channel capabilities.

30 Claims, 21 Drawing Sheets

(56) References Cited

U.S. PATENT DOCUMENTS

| | | | | |
|---|---|---|---|---|
| 2013/0241759 A1* | 9/2013 | Wiley | H04L 25/0272 | 341/173 |
| 2013/0339507 A1* | 12/2013 | Wiley | H04L 47/745 | 708/223 |
| 2014/0006649 A1* | 1/2014 | Wiley | H04L 25/02 | 710/8 |
| 2014/0112401 A1* | 4/2014 | Wiley | H04L 25/0272 | 375/259 |
| 2014/0153665 A1* | 6/2014 | Wiley | H04L 5/20 | 375/288 |
| 2014/0254712 A1* | 9/2014 | Lee et al. | | 375/295 |
| 2015/0023454 A1* | 1/2015 | Lee | G06F 13/4295 | 375/342 |
| 2015/0030112 A1* | 1/2015 | Wiley | H04L 25/0292 | 375/360 |
| 2015/0043358 A1* | 2/2015 | Wiley et al. | | 370/242 |
| 2015/0043693 A1* | 2/2015 | Lee | H04L 7/0033 | 375/354 |

OTHER PUBLICATIONS

Krammer M., et al., "Exploration of the FlexRay Signal Integrity using a Combined Prototyping and Simulation Approach," IEEE 13th International Symposium on Design and Diagnostics of Electronic Circuits and Systems (DDECS), 2010, pp. 111-116, XP031694653, ISBN: 978-1-4244-6612-2.

* cited by examiner

SPECIFYING A 3-PHASE OR N-PHASE EYE PATTERN

CROSS-REFERENCE TO RELATED APPLICATIONS

This application claims priority to and the benefit of U.S. provisional patent application No. 61/888,611 filed Oct. 9, 2013, the entire content of which being incorporated herein by reference.

BACKGROUND

1. Field

The present disclosure relates generally to high-speed data communications interfaces, and more particularly, to analysis of signaling in multi-wire, multi-phase data communication links.

2. Background

Manufacturers of mobile devices, such as cellular phones, may obtain components of the mobile devices from various sources, including different manufacturers. For example, an application processor in a cellular phone may be obtained from a first manufacturer, while the display for the cellular phone may be obtained from a second manufacturer. The application processor and a display or other device may be interconnected using a standards-based or proprietary physical interface. For example, a display may provide an interface that conforms to the Display System Interface (DSI) standard specified by the Mobile Industry Processor Interface Alliance (MIPI).

In a multi-wire interface, the maximum speed of the communication link and the ability of a clock-data recovery (CDR) circuit may be limited by the variability of transition times between symbols carried on the communication link, phase shifts between signals received from different wires of the communication link. In a multi-wire interface, and the like. Transitions on different wires may exhibit different variations of signal transition times. Traditional test and measurement systems may be unable to properly characterize the communications link when multiple transitions observed at the receiver occur at the symbol boundaries and when transition times are variable over short periods of time. For example, large transition time differences in multi-wire signals may obscure the eye opening in an eye pattern displayed by a high-speed digital storage oscilloscope.

SUMMARY

Embodiments disclosed herein provide systems, methods and apparatus that enable improved testing and measuring of channel characteristics for a multi-wire and/or multiphase communications link. The communications link may, for example, be deployed in apparatus such as a mobile terminal that include multiple semiconductor Integrated Circuit (IC) devices.

In an aspect of the disclosure, a data transfer method includes determining a trigger point corresponding to a first transition at a symbol boundary for each of a plurality of symbols received sequentially from the communications link, and providing an image that superimposes representations of the plurality of symbols one upon another. The representations may be arranged with respect to one another in the image by temporally aligning triggers determined for the plurality of symbols. Each trigger may be correlated with a sampling clock used to capture data communicated in its corresponding symbol.

In an aspect of the disclosure, the symbol boundary at which the trigger is determined occurs at the end of each symbol. In some instances, the symbol boundary at which the trigger is determined may occur at the beginning of each symbol. The first transition may include a first zero crossing of a signal output by one of a plurality of differential receivers. The first transition may include a first zero crossing of a signal produced by differential probes. The first transition may include a first zero crossing of a signal calculated from the current or voltage states observed on a plurality of wires of the communications link.

In an aspect of the disclosure, the differences in state between two wires in the communications link may be determined. The communications link may include an M-wire, N-phase decoder. In one example, a plurality of differential receivers is provided in a 3-wire, 3-phase decoder, and an output of each differential receiver may identify transitions between three or more voltage states. The communications link may include an N-factorial decoder.

In an aspect of the disclosure, each trigger is correlated with an edge of the sampling clock that is used to capture information from a delayed version of the symbol. The image may include an eye pattern.

In an aspect of the disclosure, an apparatus includes means for determining a trigger corresponding to a first transition at a symbol boundary for each of a plurality of symbols received sequentially from the communications link, and means for providing an image that superimposes representations of the plurality of symbols one upon another. The representations may be arranged with respect to one another in the image by temporally aligning triggers determined for the plurality of symbols. Each trigger may be correlated with a sampling clock used to capture data communicated in its corresponding symbol.

In an aspect of the disclosure, an apparatus includes a processing circuit configured to determine a trigger corresponding to a first transition at a symbol boundary for each of a plurality of symbols received sequentially from the communications link, and provide an image that superimposes representations of the plurality of symbols one upon another. The representations may be arranged with respect to one another in the image by temporally aligning triggers determined for the plurality of symbols. Each trigger may be correlated with a sampling clock used to capture data communicated in its corresponding symbol.

In an aspect of the disclosure, a processor-readable storage medium may have or maintain one or more instructions which, when executed by at least one processing circuit, cause the at least one processing circuit to determine a trigger corresponding to a first transition at a symbol boundary for each of a plurality of symbols received sequentially from the communications link, and provide an image that superimposes representations of the plurality of symbols one upon another. The representations may be arranged with respect to one another in the image by temporally aligning triggers determined for the plurality of symbols. Each trigger may be correlated with a sampling clock used to capture data communicated in its corresponding symbol.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Figure 1:
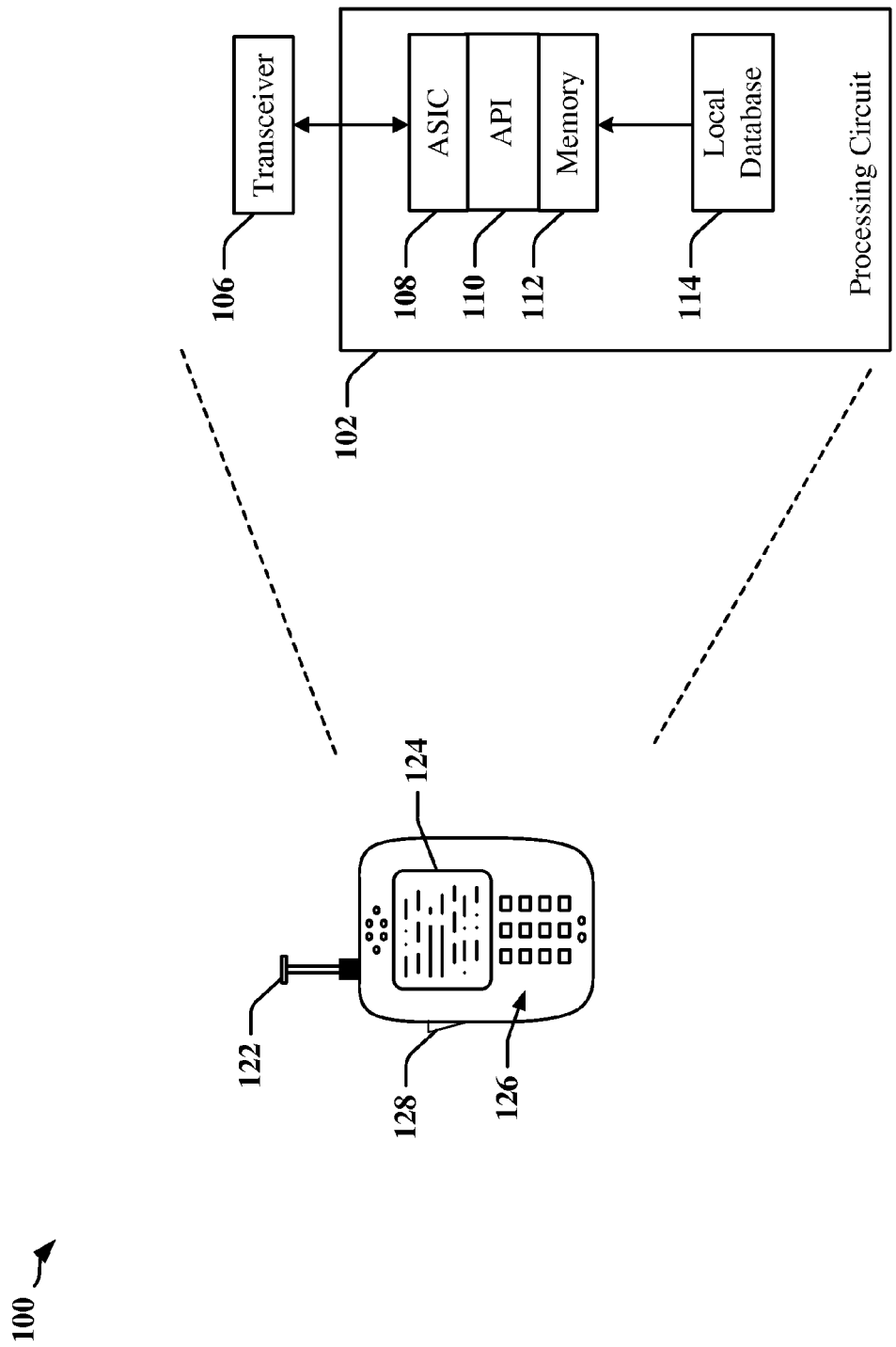
FIG. 1 illustrates an example of an apparatus employing a data link between IC devices that may be measured in accordance with certain aspects disclosed herein.

Certain aspects of the invention may be applicable to communications links deployed between electronic devices that may include subcomponents of an apparatus such as a telephone, a mobile computing device, an appliance, automobile electronics, avionics systems, etc. FIG. 1 depicts a simplified example of an apparatus that employs a communication link between IC devices. The apparatus 100 may include a communications transceiver 106 operably coupled to a processing circuit 102. In one example, the apparatus 100 may include a wireless communication device that communicates through an RF transceiver 106 with a radio access network (RAN), a core access network, the Internet and/or another network. The processing circuit 102 may include an application-specific IC (ASIC) 108 and/or one or more other IC devices. The ASIC 108 may include one or more processing devices, logic circuits, and so on. The processing circuit 102 may include and/or be coupled to processor readable storage such as a memory 112 that may maintain instructions that can be executed by a processor of the processing circuit 102, and data that may be manipulated by the processing circuit 102. Certain functions of the processing circuit 102 may be controlled by one or more of an operating system and an application programming interface (API) 110 layer that supports and enables execution of software modules residing in storage media, such as the memory device 112. The memory device 112 may include read-only memory (ROM) or random-access memory (RAM), electrically erasable programmable ROM (EEPROM), flash memory cards, or any memory device that can be used in processing systems and computing platforms. The processing circuit 102 may have access to, or include a local database 114 that may be configured to maintain operational parameters and other information used to configure and operate the apparatus 100. The local database 114 may be implemented using one or more of a database module, flash memory, magnetic media, EEPROM, optical media, tape, soft or hard disk, or the like. The processing circuit 102 may also be operably coupled to external devices such as an antenna 122, a display 124, operator controls, such as a keypad 126, a button, rocker or slider switch 128, and/or other components.

Figure 2:
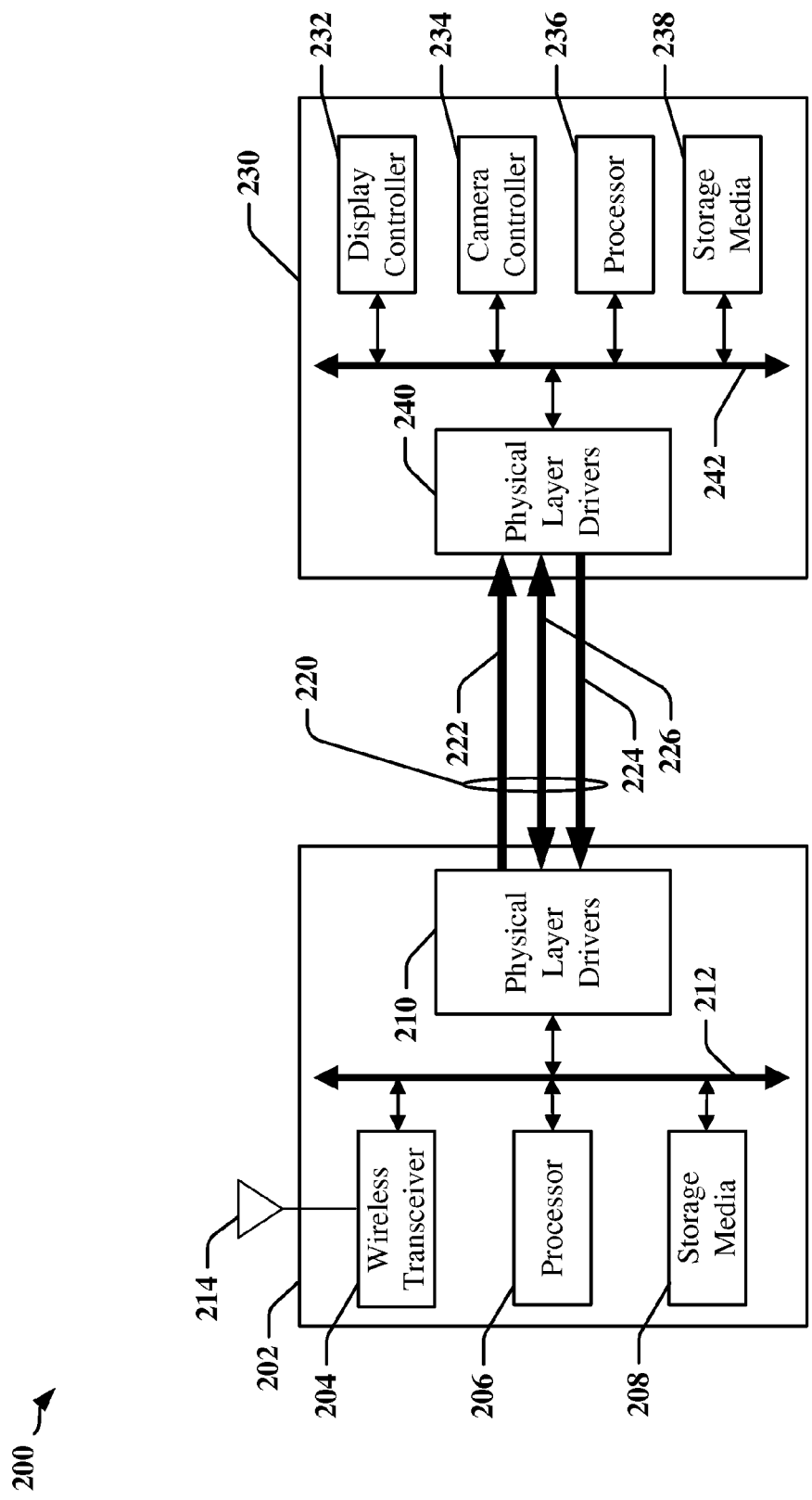
FIG. 2 illustrates a system architecture for an apparatus employing a data link between IC devices that may be measured in accordance with certain aspects disclosed herein.

FIG. 2 is a block schematic diagram illustrating certain aspects of an apparatus 200 such as a wireless mobile device, a mobile telephone, a mobile computing system, a wireless telephone, a notebook computer, a tablet computing device, a media player, a gaming device, an appliance, a wearable computing device, or the like. The apparatus 200 may include a plurality of IC devices 202 and 230 that exchange data and control information through a communication link 220. The communication link 220 may be used to connect the IC devices 202 and 230, whether the IC devices 202, 230 are located in close proximity to one another, or located in physically different parts of the apparatus 200. In one example, the communication link 220 may be provided on a chip carrier, substrate or circuit board that carries the IC devices 202 and 230. In another example, a first IC device 202 may be located in a keypad section of a flip-phone while a second IC device 230 may be located in a display section of the flip-phone. In another example, a portion of the communication link 220 may include a cable or optical connection.

The communication link 220 may include multiple channels 222, 224 and 226. One or more channel 226 may be bidirectional, and may operate in a half-duplex mode and/or in a full-duplex mode. One or more channels 222 and/or 224 may be unidirectional. The communication link 220 may be asymmetrical, providing higher bandwidth in one direction. In one example, a first communications channel 222 may be referred to as a forward link 222 while a second communications channel 224 may be referred to as a reverse link 224. The first IC device 202 may be designated as a host system or a transmitter, while the second IC device 230 may be designated as a client system or a receiver, even if both IC devices 202 and 230 are configured to transmit and receive on the communications link 222. In one example, the forward link 222 may operate at a higher data rate when communicating data from a first IC device 202 to a second IC device 230, while the reverse link 224 may operate at a lower data rate when communicating data from the second IC device 230 to the first IC device 202.

The IC devices 202 and 230 may each include a processor 206, 236, which may be provided in a processing circuit, computing circuit, or other circuit. In one example, the first IC device 202 may be adapted to perform core functions of the apparatus 200, including maintaining wireless communications through a wireless transceiver 204 and an antenna 214, while the second IC device 230 may be configured to support a user interface that manages or operates a display controller 232, and may control operations of a camera or video input device using a camera controller 234. Other features supported by one or more of the IC devices 202 and 230 may include a keyboard, a voice-recognition component, global positioning systems, biometric recognition systems, motion sensors, and other input or output devices. The display controller 232 may include circuits and software drivers that support displays such as a liquid crystal display (LCD) panel, touch-screen display, indicators and so on. The storage media 208 and 238 may include transitory and/or non-transitory storage devices adapted to maintain instructions and data used by respective processors 206 and 236, and/or other components of the IC devices 202 and 230. Communication between each processor 206, 236 and its corresponding storage media 208 and 238 and other modules and circuits may be facilitated by one or more bus 212 and 242, respectively.

The reverse link 224 may be operated in the same manner as the forward link 222, and the forward link 222 and reverse link 224 may be capable of transmitting at comparable speeds or at different speeds, where speed may be expressed as a data rate (or data transfer rate) and/or a transmitter clocking rate. The forward and reverse data rates may be substantially the same or may differ by orders of magnitude, depending on the application. In some applications, a single bidirectional link 226 may support communications between the first IC device 202 and the second IC device 230. The forward link 222 and/or reverse link 224 may be configurable to operate in a bidirectional mode when, for example, the forward and reverse links 222 and 224 share the same physical connections and operate in a half-duplex manner. In one example, the communication link 220 may be operated to communicate data, control, command and other information between the first IC device 202 and the second IC device 230 in accordance with an industry or other standard.

Industry standards may be application specific. In one example, the MIPI standard defines physical layer interfaces including a synchronous interface specification (D-PHY) between an application processor IC device 202 and an IC device 230 that supports the camera or display in a mobile device. The D-PHY specification governs the operational characteristics of products that comply with MIPI specifications for mobile devices. A D-PHY interface may support data transfers using a flexible, low-cost, high-speed serial interface that interconnects between components 202 and 230 within a mobile device. These interfaces may include complimentary metal-oxide-semiconductor (CMOS) parallel busses providing relatively low bit rates with slow edges to avoid electromagnetic interference (EMI) issues.

The communication link 220 of FIG. 2 may be implemented as a wired bus that includes a plurality of signal wires (denoted as M wires). The M wires may be configured to carry N-phase encoded data in a high-speed digital interface, such as in a display interface. The M wires may facilitate N-phase polarity encoding on one or more of the channels 222, 224 and/or 226. The physical layer drivers 210 and 240 may be configured or adapted to generate N-phase polarity encoded data symbols for transmission on the communication link 220, and/or to decode N-phase polarity encoded data symbols received from the communication link 220. The use of N-phase polarity encoding provides high speed data transfer and may consume half or less of the power of other interfaces because, for example, fewer drivers are active in N-phase polarity encoded data links 220.

N-phase polarity encoding devices 210 and/or 240 can typically encode multiple bits per transition on the communication link 220. In one example, a combination of 3-phase encoding and polarity encoding may be used to support a wide video graphics array (WVGA) 80 frames per second LCD driver IC without a frame buffer, delivering pixel data at 810 Mbps for display refresh.

Figure 3:
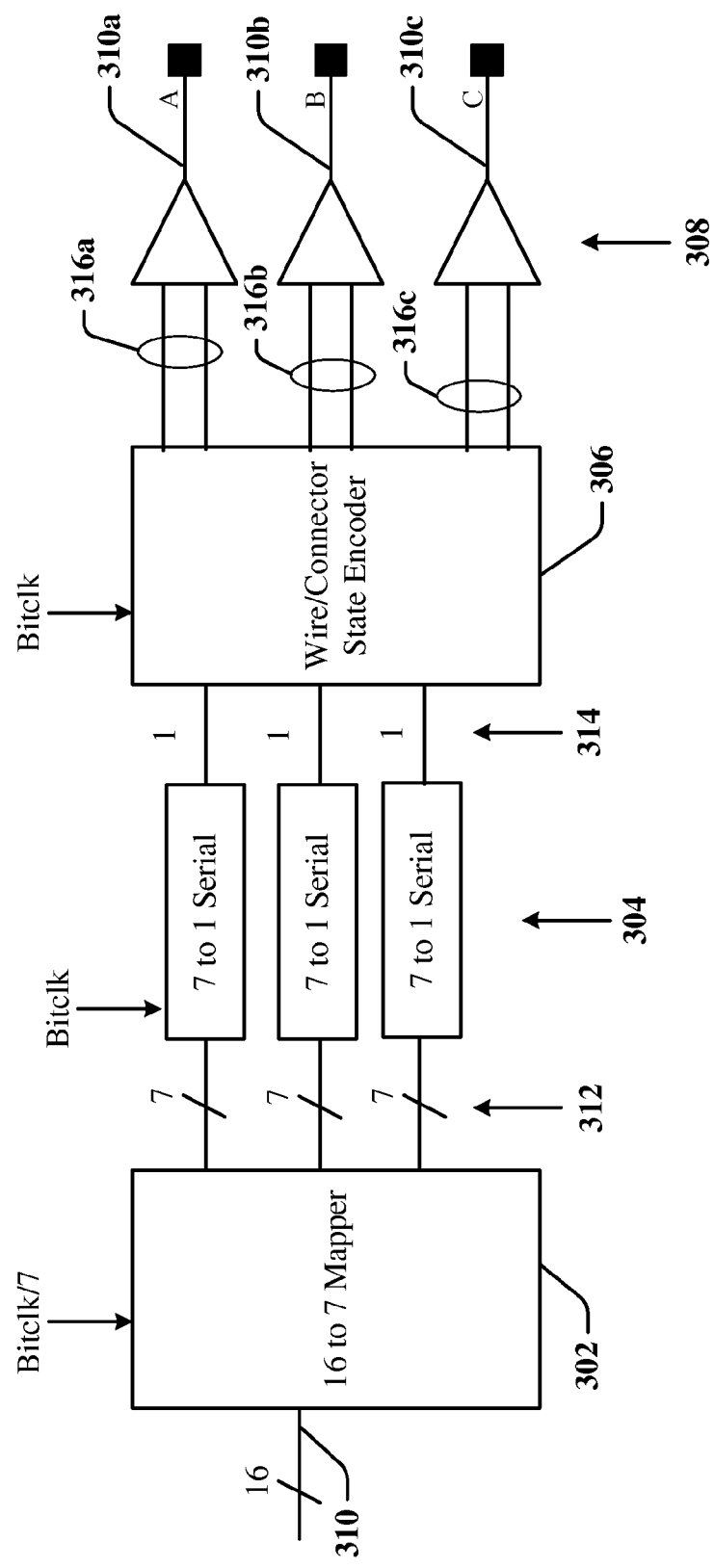
FIG. 3 illustrates an N-phase polarity data encoder.

FIG. 3 is a block schematic diagram illustrating a simplified example of an M-wire, N-phase polarity encoder 300 that may be used to implement certain aspects of the communication link 220 depicted in FIG. 2. In the example, the M-wire, N-phase polarity encoder 300 is configured to transmit information using M=3 wires and N=3 phase signaling. The example of 3-wire, 3-phase encoding is selected solely for the purpose of simplifying descriptions of certain aspects of the invention. The principles and techniques disclosed for 3-wire, 3-phase encoders can be applied in other configurations of M-wire, N-phase polarity encoders and decoders.

Signaling states defined for each of the M wires in an M-wire, N-phase polarity encoding scheme may include an undriven state, a positively driven state and a negatively driven state. In the 3-wire, 3-phase polarity encoding scheme, the positively driven state and the negatively driven state may be obtained by providing a voltage differential between two of the signal wires 310a, 310b and/or 310c, and/or by driving a current through two of the signal wires 310a, 310b and/or 310c connected in series such that the current flows in different directions in the two signal wires 310a, 310b and/or 310c.

In one example, the undriven state may be realized by placing an output of a driver of a signal wire 310a, 310b or 310c in a high-impedance mode. In another example, the undriven state may be obtained on a signal wire 310a, 310b or 310c by passively or actively causing an "undriven" signal wire 310a, 310b or 310c to assume a voltage level that lies substantially halfway between positive and negative voltage levels provided on driven signal wires 310a, 310b and/or 310c. Typically, no significant current flows through an undriven signal wire 310a, 310b or 310c. Signaling states defined for a 3-wire, 3-phase polarity encoding scheme may be denoted using the three signaling states {+1, 0, −1}, which may represent voltage or current states. In one example, the three states {+1, 0, −1} may signify the three voltage levels +V, 0, −V. In another example, the three states {+1, 0, −1} may signify the three voltage levels +V, +V/2, 0. In another example, the three states {+1, 0, −1} may signify currents of I, 0, −I.

A 3-wire, 3-phase, polarity encoder may employ a set of drivers 308 to control the signaling state of the connectors/wires 310a, 310b and 310c. The drivers 308 may be implemented as unit-level current-mode or voltage-mode drivers. Each driver 308 may receive a set of signals 316a, 316b or 316c that determines the signaling state of a corresponding connector 310a, 310b or 310c. In the example depicted, each of the drivers 308 receives a pair of signals 316a, 316b or 316c that defines four possible states for the corresponding connector 310a, 310b or 310c. In another example, each driver 308 may receive a set of three signals defining 8 possible states for the corresponding connector 310a, 310b, or 310c.

For each transmitted symbol interval in an M-wire, N-phase polarity encoding scheme, at least one signal wire 310a, 310b or 310c is in the undriven state (0 signaling state), while the number of positively driven (+1 signaling state) signal wires 310a, 310b or 310c is equal to the number of negatively driven (−1 signaling state) signal wires 310a, 310b or 310c, such that the sum of current flowing to the receiver is zero. At each symbol transition, between the previously transmitted symbol and a next transmitted symbol, the signaling state of at least one signal wire 310a, 310b or 310c changes. When the signaling state of at least one signal wire 310a, 310b and/or 310c changes between each pair of consecutive symbols, a receiver can reliably generate a receive clock based on the transitions.

In operation, a mapper 302 may receive and map input data 310 to a set of symbols 312. In the depicted 3-wire, 3-phase example, the set of symbols includes seven 3-bit symbols, and a 16-bit word of the input data 310 may be encoded in each set of symbols. Each bit of a 3-bit symbol defines the state of one of the signal wires 310a, 310b and 310c for one symbol interval. The sequence of symbols 312 may be serialized using parallel-to-serial converters 304 that provide a timed sequence of symbols 314, each symbol defining the signaling state of the 3-wires 310a, 310b and 310c. The sequence of symbols 314 is typically timed using a transmission clock to delineate symbol intervals, whereby a single symbol is transmitted in each symbol interval. A 3-wire phase encoder 306 receives the sequence of 7 symbols 314 produced by the mapper one symbol at a time and computes the state of each signal wire 310a, 310b and 310c for each symbol interval. The 3-wire encoder 306 selects the states of the signal wires 310a, 310b and 310c based on the current input symbol 314 and the previous states of signal wires 310a, 310b and 310c.

The use of M-wire, N-phase encoding permits a number of bits to be encoded in a plurality of symbols. A non-integer number of data bits may be encoded in each symbol. In the example of a 3-wire, 3-phase system, there are 3 available combinations of 2 wires that may be driven simultaneously, and 2 possible combinations of polarity on the pair of wires that is driven, yielding 6 possible states. The signaling state of the signal wires 310a, 310b and 310c changes at each transition between symbols and, accordingly, 5 of the 6 states are available at every transition. In other words, the state of at least one wire changes at each transition to permit a receiver to generate a reliable receive clock and, given a current signaling state, there are five possible signaling states available at each transition. With 5 states, $\log_2(5) \cong 2.32$ bits may be encoded per symbol. Accordingly, a mapper may accept a 16-bit word and convert it to 7 symbols because 7 symbols carrying 2.32 bits per symbol can encode 16.24 bits. In other words, a combination of seven symbols that encode five states has $5^7$ (78,125) permutations. Accordingly, the 7 symbols may be used to encode the $2^{16}$ (65,536) permutations of 16 binary bits.

Figure 4:
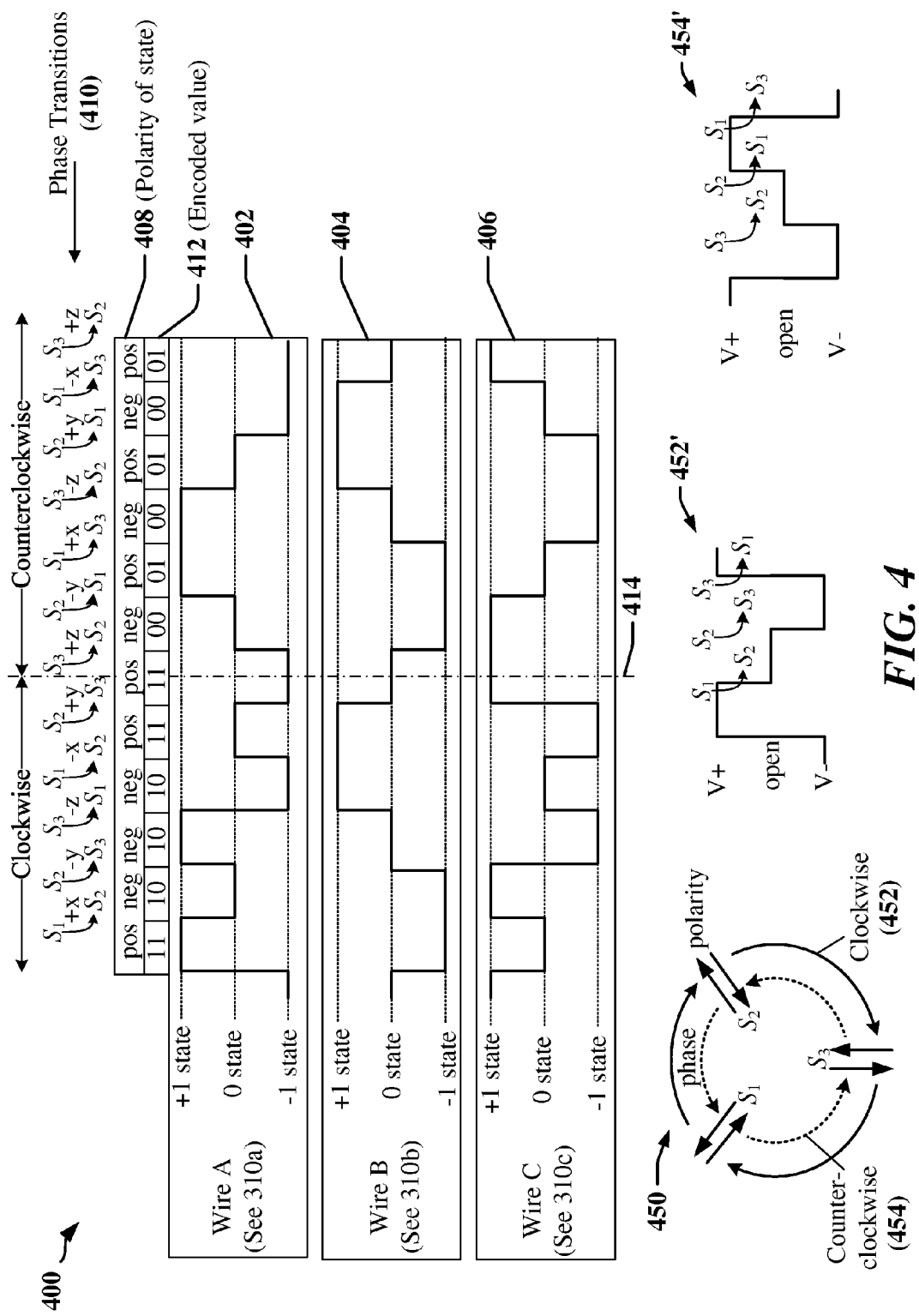
FIG. 4 illustrates signaling in an N-phase polarity encoded interface.

FIG. 4 is a diagram that includes an example of a timing chart 400 for signals encoded using a three-phase modulation data-encoding scheme. The data-encoding scheme is illustrated by the circular state diagram 450. Information may be encoded in a sequence of signaling states where, for example, the signaling state of each wire or connector 310a, 310b, 310c is consistent with one of three phase states $S_1$, $S_2$, $S_3$ defined by the state diagram 450. Each state may be separated from the other states by a 120° phase shift. In one example, data may be encoded in the direction of rotation of phase states on the wire or connector 310a, 310b, 310c at each transition between symbols. The phase states in a signal may rotate in clockwise direction 452, 452' or counterclockwise direction 454, 454'. In the clockwise direction 452, 452' for example, the phase states may advance in a sequence that includes one or more of the transitions from $S_1$ to $S_2$, from $S_2$ to $S_3$ and from $S_3$ to $S_1$. In the counterclockwise direction 454, 454', the phase states may advance in a sequence that includes one or more of the transitions from $S_1$ to $S_3$, from $S_3$ to $S_2$ and from $S_2$ to $S_1$. The three wires 310a, 310b and 310c carry different phase-shifted versions of the same signal, where the versions are phase shifted by 120° with respect to one another. Each signaling state may be represented as a different voltage level on a wire or connector and/or a direction of current flow through the wire or connector. During each of the sequence of signaling states in a 3-wire system, each wire 310a, 310b and 310c is in a different signaling states than the other wires. When more than three wires 310a, 310b and 310c are used in a 3-phase encoding system, two or more wires 310a, 310b and/or 310c can be in the same signaling state at each signaling interval, although each state is present on at least one wire 310a, 310b and/or 310c in every signaling interval.

Information may be encoded in the direction of rotation at each phase transition 410, and the 3-phase signal may change direction for each signaling state. Direction of rotation may be determined by considering which wires 310a, 310b and/or 310c are in the '0' state (e.g., the undriven state) before and after a phase transition, because the undriven wire 310a, 310b and/or 310c changes at every signaling state in a rotating three-phase signal, regardless of the direction of rotation.

The encoding scheme may also encode information in the polarity 408 of the two conductors 310a, 310b and/or 310c that are actively driven. At any time in a 3-wire implementation, exactly two of the conductors 310a, 310b, 310c are driven with currents in opposite directions and/or with a voltage differential. In a simple implementation, data 412 may be encoded using two bit values 412, where one bit is encoded in the direction of phase transitions 410 and the second bit is encoded in the polarity 408 of the current state.

The timing chart 400 illustrates data encoding using both phase rotation direction and polarity. The curves 402, 404 and 406 relate to signals carried on three wires 310a, 310b and 310c, respectively for multiple phase states. Initially, the phase transitions 410 are in a clockwise direction and the most significant bit is set to binary '1,' until the rotation of phase transitions 410 switches at a time 414 to a counter-clockwise direction, as represented by a binary '0' of the most significant bit. The least significant bit reflects the polarity 408 of the signal in each state.

In some instances, the encoding scheme may encode information in changes in the polarity 408 of the two actively driven conductors 310a, 310b and/or 310c. In one example, a bit having a value of "1" may be encoded as a change in polarity 408 between two symbol intervals, while a bit having a value of "0" may be encoded as no change in polarity 408 between the two symbol intervals. A decoder may be configured to decode data at the boundaries between symbols by detecting changes in direction of rotation and changes in polarity. If data is encoded in changes in polarity between two symbol intervals in the example of FIG. 4, the depicted sequence of encoded values 412 can be replaced by the sequence {11, 10, 10, 11, 10, 01, 01, 01, 01, 01, 01, 01}.

According to certain aspects disclosed herein, one bit of data may be encoded in the rotation or phase change in a 3-wire, 3-phase encoding system, and an additional bit may be encoded in the polarity of the two driven wires or in a change in polarity of the driven wires compared to the polarity used in the previous wire state. Additional information may be encoded in each transition of a 3-wire, 3-phase encoding system by allowing transition to any of the possible states from a current state. Given 3 rotational phases and two polarities for each phase, 6 states are available in a 3-wire, 3-phase encoding system. Accordingly, 5 states are available for transition from any current state. Accordingly, there may be $\log_2(5) \cong 2.32$ bits encoded per symbol (transition), which allows the mapper 302 to accept a 16-bit word and encode it in a sequence of 7 symbols.

N-Phase data transfer may use more than three wires provided in a communication medium, such as a bus. The use of additional signal wires that can be driven simultaneously provides more combinations of states and polarities and allows more bits of data to be encoded at each transition between states. This can significantly improve throughput of the system, and reduce the power consumption over approaches that use multiple differential pairs to transmit data bits, while providing increased bandwidth.

In one example, an encoder may transmit symbols using 6 wires with 2 pairs of wires driven for each state. The 6 wires may be labeled A through F, such that in one state, wires A and F are driven positive, wires B and E negative, and C and D are undriven (or carry no current). For six wires, there may be:

$$C(6, 4) = \frac{6!}{(6-4)! \cdot 4!} = 15$$

possible combinations of actively driven wires, with:

$$C(4, 2) = \frac{4!}{(4-2)! \cdot 2!} = 6$$

different combinations of polarity for each phase state.

The 15 different combinations of actively driven wires may include:

| | | | | |
|---|---|---|---|---|
| A B C D | A B C E | A B C F | A B D E | A B D F |
| A B E F | A C D E | A C D F | A C E F | A D E F |
| B C D E | B C D F | B C E F | B D E F | C D E F |

Of the 4 wires driven, the possible combinations of two wires driven positive (and the other two must be negative). The combinations of polarity may include:

| | | | | | |
|---|---|---|---|---|---|
| + + − − | + − − + | + − + − | − + − + | − + + − | − − + + |

Accordingly, the total number of different states may be calculated as 15×6=90. To guarantee a transition between symbols, 89 states are available from any current state, and the number of bits that may be encoded in each symbol may be calculated as: $\log_2(89) \cong 6.47$ bits per symbol. In this example, a 32-bit word can be encoded by the mapper into 5 symbols, given that 5×6.47=32.35 bits.

The general equation for the number of combinations of wires that can be driven for a bus of any size, as a function of the number of wires in the bus and number of wires simultaneously driven:

$$C(N_{wires}, N_{driven}) = \frac{N_{wires}!}{(N_{wires} - N_{driven})! \cdot N_{driven}!}$$

The equation for the number of combinations of polarity for the wires being driven is:

$$C\left(N_{driven}, \frac{N_{driven}}{2}\right) = \frac{N_{driven}!}{\left(\left(\frac{N_{driven}}{2}\right)!\right)^2}$$

The number of bits per symbol is:

$$\log_2\left(C(N_{wires}, N_{driven}) \cdot C\left(N_{driven}, \frac{N_{driven}}{2}\right) - 1\right)$$

Figure 5:
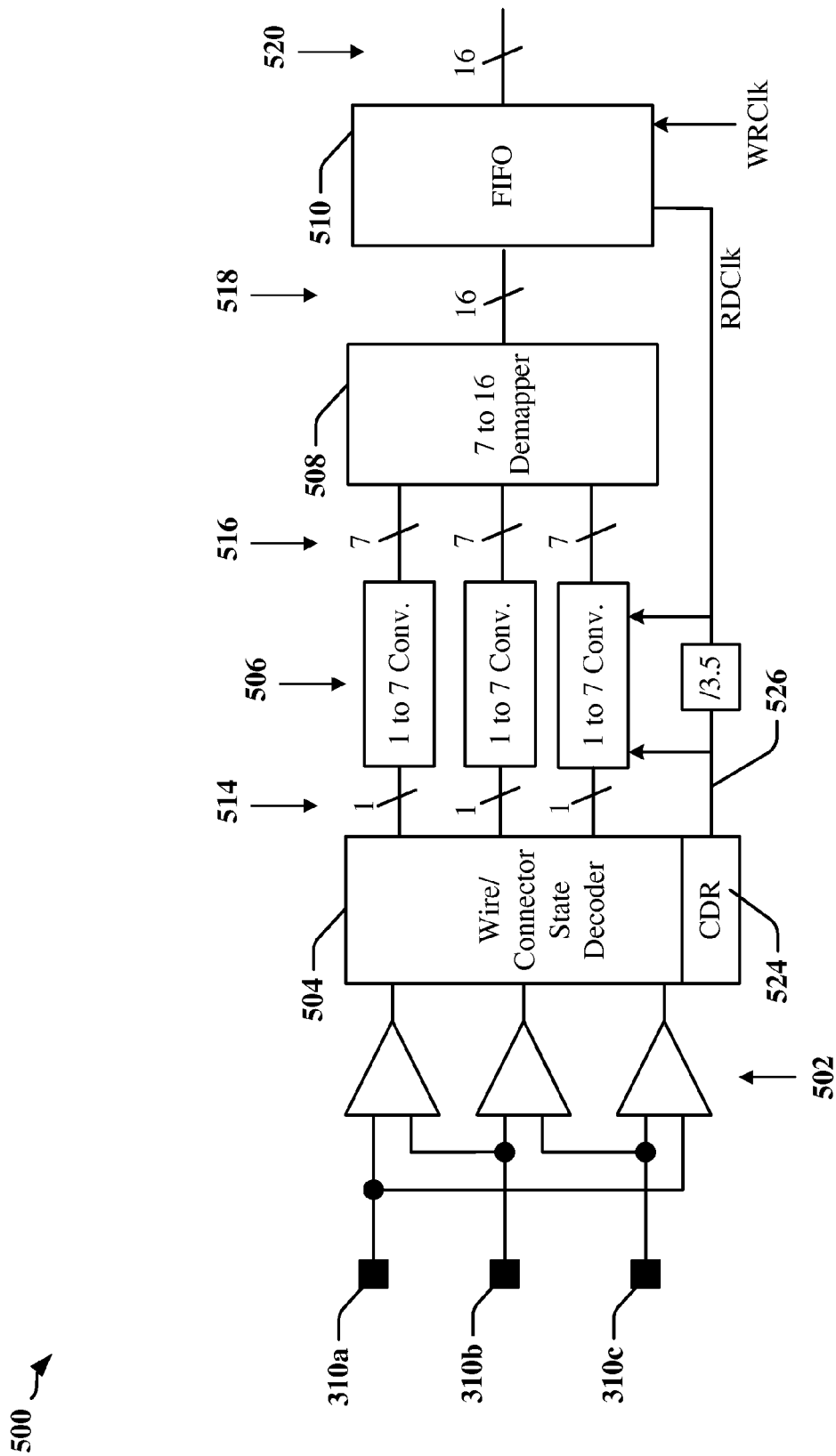
FIG. 5 illustrates an N-phase polarity decoder.

FIG. 5 is a block schematic diagram 500 illustrating certain aspects of a simplified example of a 3-wire, 3-phase decoder. Differential receivers 502 and a wire state decoder 504 are configured to provide a digital representation of the state of the three signal wires 310a, 310b and 310c, with respect to one another, and to detect changes in the signaling state of the three signal wires 310a, 310b and 310c compared to the signaling state of the three signal wires 310a, 310b and 310c in the preceding symbol period. The digital representation of the signaling state of the three signal wires 310a, 310b and 310c during a symbol period may be referred to as a raw symbol. A sequence of seven consecutive raw symbols 514 are assembled by serial-to-parallel converters 506 to obtain a set of 7 symbols 516 to be processed by demapper 508. The demapper 508 produces 16 bits of output data 518 that may be buffered in FIFO 510 to provide output data 520.

In operation, the wire state decoder 504 may extract a sequence of symbols 514 from signals received on wires 310a, 310b and 310c. The symbols 514 are decoded based on signaling states that may be represented as a combination of phase rotation and polarity, or changes in polarity, of the signals received on wires 310a, 310b and 310c, as disclosed herein. The wire state decoder may include a CDR 524, which extracts a clock 526 that can be used to reliably capture symbols from the wires 310a, 310b and 310c. The CDR 524 may be configured to generate the clock 526 based on the occurrence of a transition on least one of the wires 310a, 310b and/or 310c at each boundary between consecutive symbol intervals. The CDR 524 may delay an edge of the clock 526 to allow time for all wires 310a, 310b and 310c to stabilize and to thereby ensure that the current symbol can be reliably captured for decoding purposes.

The delay used by the CDR 524 may be configured to allow a period of time sufficient to mask the effect of multiple edges at the same symbol boundary, where the multiple edges are generated at different times by different ones of the differential receivers 502. These multiple edges can arise when certain state transitions cause different differential receivers 502 to produce edges that are separated in time with respect to one another. The CDR 524 may include a delay element that delays response to a first occurring edge at a symbol boundary until a time when all possible edges have occurred. The CDR 524 may respond to the first occurring edge at a symbol boundary, initiate a delay period at the symbol boundary, and ignore any other edges occurring after the symbol boundary until the delay period has elapsed.

Variations in the performance of components of the CDR 524 may be expected to affect the delays between multiple edges. These variations in performance of components in the CDR 524 may be accommodated by configuring a delay for the CDR 524 that accounts for worst-case conditions. The variations in performance may be caused by changes in power, voltage and temperature (PVT) conditions, for example. The duration of the delay may affect the performance of the communications link and may limit the maximum clock frequency that can be used in the communications link. If the configured delay is too short, then multiple clock pulses may be created for a single symbol, which may cause loss of synchronization between transmitter and receiver. If the delay is too long, symbol times may overlap, thereby causing the clock recovery circuit to malfunction or generate a single pulse for two symbol intervals.

Figure 6:
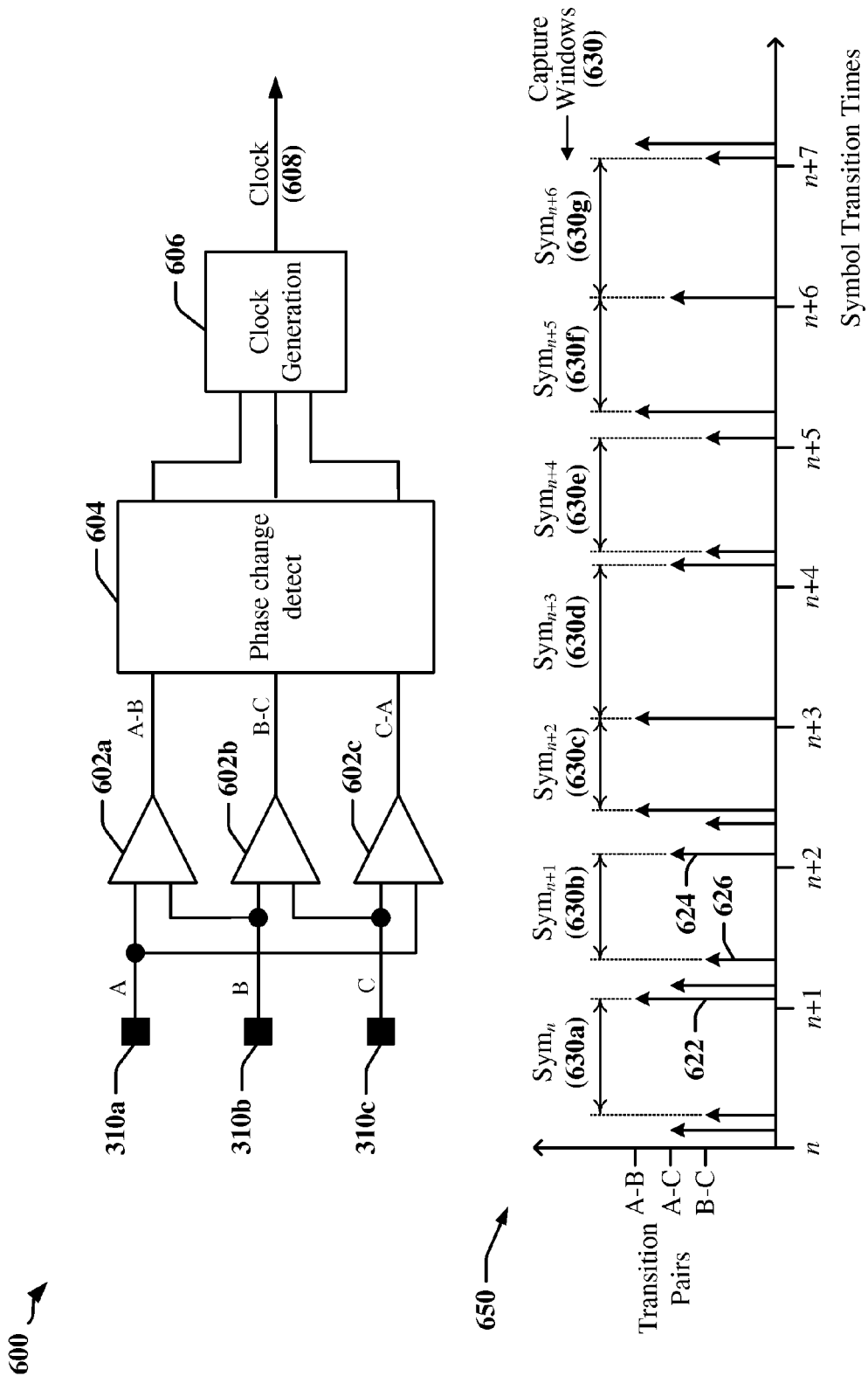
FIG. 6 illustrates transition detection in an M-wire, N-phase polarity decoder.

FIG. 6 includes a block schematic diagram 600 illustrating certain aspects of clock generation in a 3-wire, 3-phase decoder. A set of differential receivers 602a, 602b and 602c compares the signaling state of each of the three signal wires 310a, 310b and 310c with the signaling states of the other of the three wires 310a, 310b and 310c. In the example depicted, a first differential receiver 602a compares the signaling states of wires 310a and 310b, a second differential receiver 602b compares the states of wires 310b and 310c and a third differential receiver 602c compares the states of wires 310a and 310c. As described herein, signaling state of at least one of the wires 310a, 310b and 310c changes at each symbol boundary. Accordingly, a state change detection circuit 604 can detect the occurrence of a change in signaling state when the output of at least one of the differential receivers 602a, 602b and 602c changes at the end of each symbol interval.

Certain signaling state transitions may be detectable by a single differential receiver 602a, 602b or 602c, while other signaling state transitions may be detected by two or more of the differential receivers 602a, 602b and/or 602c. In one example, the signaling states of two wires may be unchanged after a symbol transition, and the output of a corresponding differential receiver 602a, 602b or 602c may also be unchanged after the symbol transition. In another example, both wires in a pair of wires 602a, 602b and/or 602c may be in the same first state in a first time interval and both wires may be in a same second state in a second time interval, such that the output of a corresponding differential receiver 602a, 602b or 602c may be unchanged after the phase transition. Accordingly, a clock generation circuit 606 may include signaling state change detect circuits and logic 604 that monitor the outputs of all differential receivers 602a, 602b and 602c in order to determine when a signaling state transition has occurred. The clock generation circuit may generate a receive clock 608 based on detected signaling state transitions.

Changes in signaling states on different wires 310a, 310b and/or 310c may occur or be detected at different times. The timing of detection of the signaling state changes may vary according to the type of signaling state change that has occurred. The result of this variability is illustrated in the simplified timing diagram 650 provided in FIG. 6. Markers 622, 624 and 626 representing the outputs of the signaling state change detection circuit 604 and/or differential receivers 602a, 602b and 602c are assigned different heights for clarity of illustration only. The relative heights of markers 622, 624 and 626 have no specific relationship to voltage or current levels, polarity or weighting values used for clock generation or data decoding. The timing chart 650 illustrates the effect of timing of transitions associated with symbols transmitted on the three wires 310a, 310b and 310c. In the timing chart 650, transitions between some symbols may result in variable capture windows 630a, 630b, 630c, 630d, 630e, 630f and/or 630g (collectively, the symbol capture windows 630) during which symbols may be reliably captured. The number of signaling state changes detected and their relative timing can result in jitter on the clock signal 608.

Figure 7:
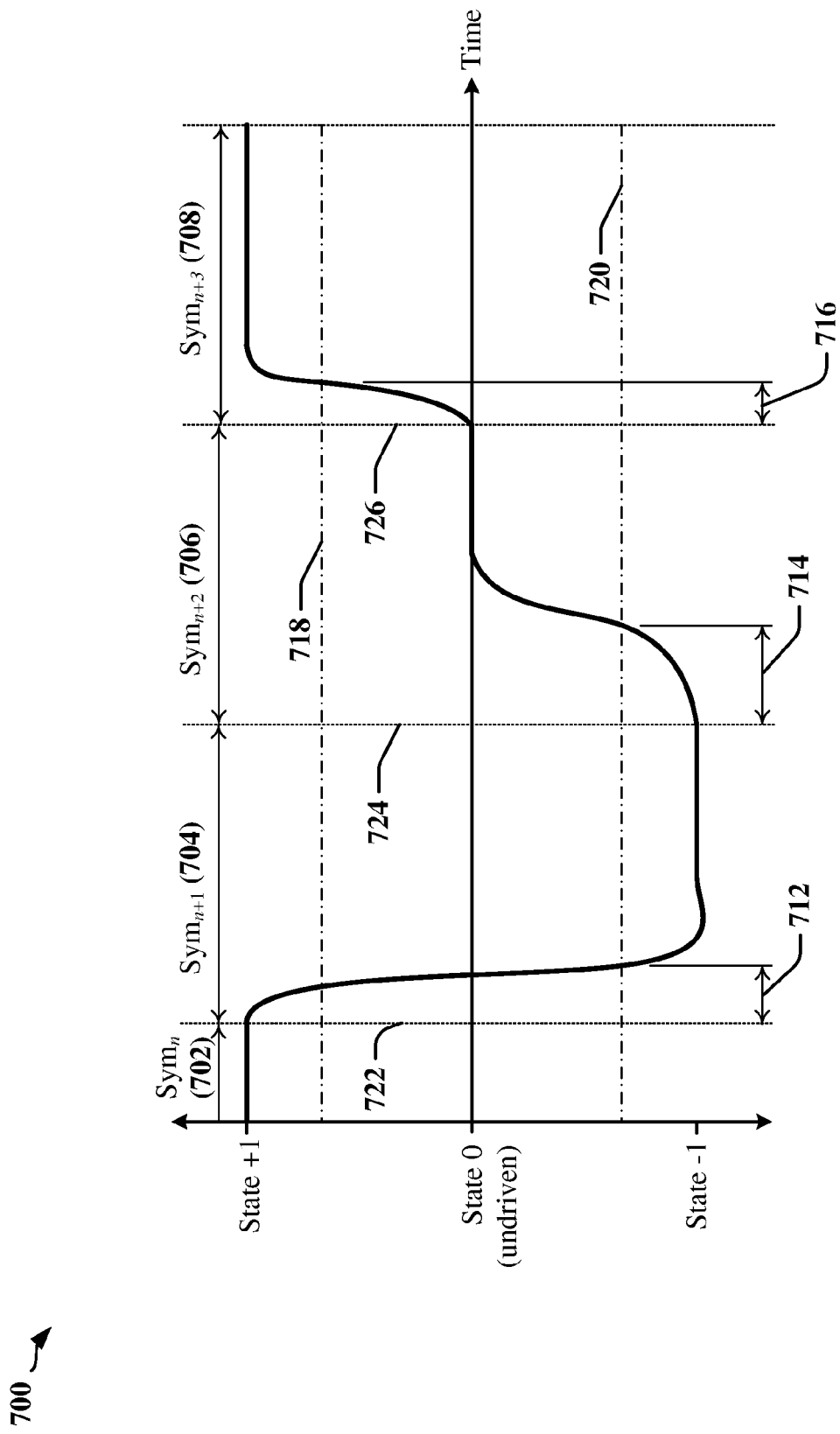
FIG. 7 is a simplified example of the effects of signal rise times on transition detection in an M-wire N-phase polarity decoder.

Variability in the sizes of the symbol capture windows 630, and associated jitter, may be caused in part by the electrical characteristics of the wires 310a, 310b and 310c, as illustrated in the simple example 700 depicted in FIG. 7. Transition times may be affected by variability in signal rise or fall times and/or variability in detection circuits caused by manufacturing process tolerances, variations and stability of voltage and current sources and operating temperature. Large variability in transition times may be attributable to the existence of different voltage or current levels in 3-phase signaling. A simplified "voltage-level" example is depicted in FIG. 7, which illustrates transition times in a single wire 310a, 310b or 310c. A first symbol ($Sym_n$) 702 may be transmitted in a symbol interval that ends at time 722, a second symbol ($Sym_{n+1}$) may be transmitted in a symbol interval that ends at time 724 and a third symbol ($Sym_{n+2}$) 706 may be transmitted in a symbol interval that ends at time 726, when transmission of a fourth symbol ($Sym_{n+3}$) 708 begins. The transition from a state determined by the first symbol 702 to the state corresponding to the second symbol 704 may be detected after a first delay 712 attributable to the time taken for voltage in the wire 310a, 310b or 310c to reach a threshold voltage 718 and/or 720. The threshold voltages may be used to determine the state of the wire 310a, 310b or 310c. The transition from a state determined by the second symbol 704 to the state for the third symbol 706 may be detected after a second delay 714 attributable to the time taken for voltage in the wire 310a, 310b or 310c to reach one of the threshold voltages 718 and/or 720. The transition from a state determined by the third symbol 706 to the state for the fourth symbol 708 may be detected after a third delay 716 attributable to the time taken for voltage in the wire 310a, 310b or 310c to reach a threshold voltage 718 and/or 720.

As depicted, the third delay 716 may be shorter than the first delay 712, and the second delay 714 may be the longest delay. The second delay 714 may be the longest delay because state 0 is an undriven state and the voltage in the wire 310a, 310*b* or 310*c* may drift slowly towards the threshold 720, whereas the first delay 712 and the second delay 716 are associated with transitions in which the wire 310*a*, 310*b* or 310*c* is actively pulled to the −1 and +1 states, respectively.

Figure 8:
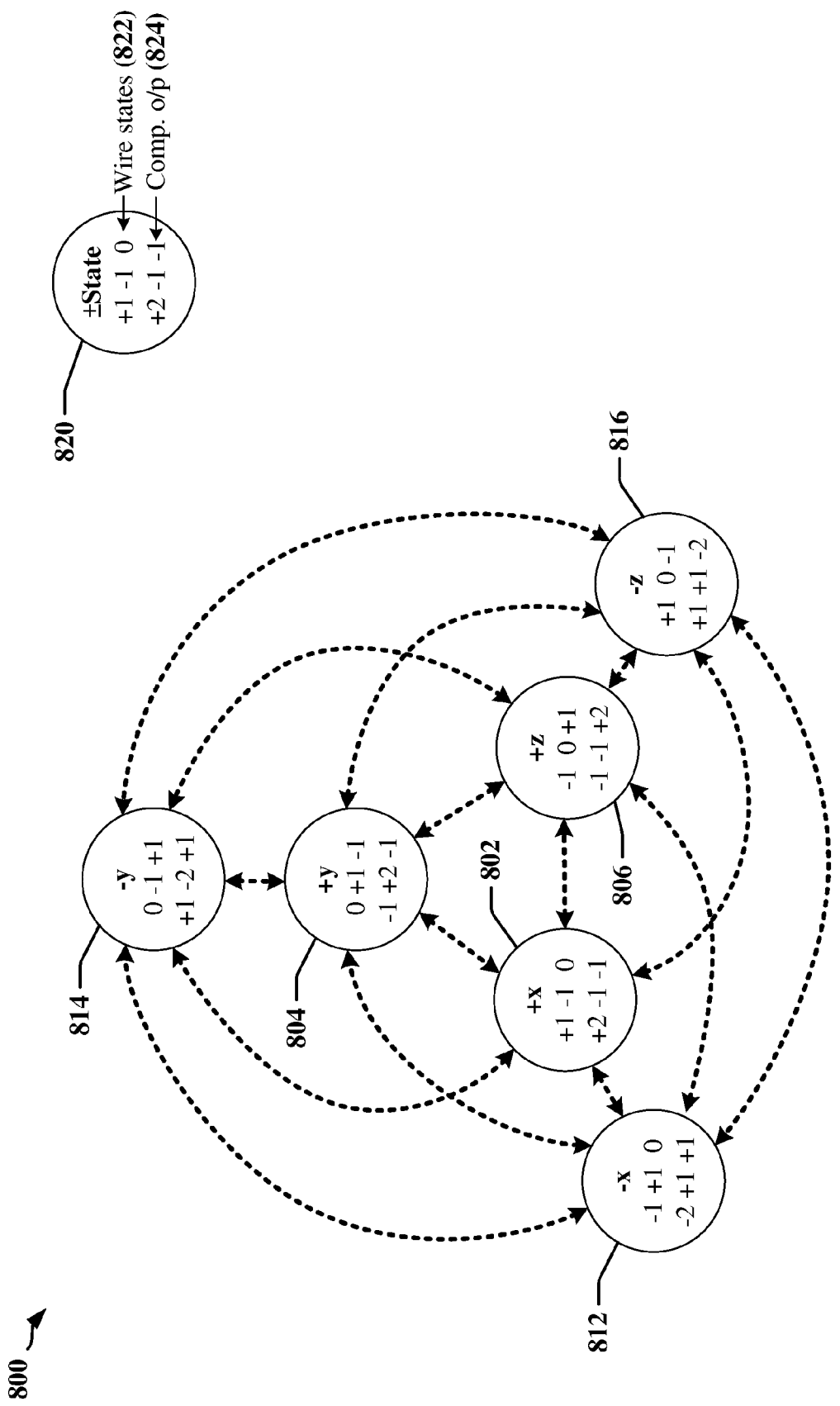
FIG. 8 is a state diagram illustrating available state transitions in an M-wire, N-phase polarity decoder.

FIG. 8 is a state diagram 800 illustrating 6 possible phase-polarity states and 30 possible state transitions in one example of a 3-wire, 3-phase communication link. The possible states 802, 804, 806, 812, 814 and 816 in the state diagram 800 include the states shown in the diagram 450 of FIG. 4. As shown in the example state element 820, each state 802, 804, 806, 812, 814 and 816 in the state diagram 800 includes a field 822 showing the signaling state of signals A, B and C transmitted on wires 310*a*, 310*b* and 310*c* respectively, and a field 824 showing the result of a subtraction of wire voltages by differential receivers (such as the differential receivers 602*a*, 602*b*, 602*c* depicted in FIG. 6). For example, in state 802 (+x) wire A=+1, wire B=−1 and wire C=0, yielding output of differential receiver 602*a* (A−B)=+2, differential receiver 602*b* (B−C)=−1 and differential receiver 602*c* (C−A)=+1. As illustrated by the state diagram, transition decisions taken by state change detect circuitry 604 are based on 5 possible levels produced by differential receivers 602*a*, 602*b* and 602*c*, which include −2, −1, 0, +1 and +2 voltage states.

An eye pattern, or eye diagram, is a time-domain display of a digital data signal where many data interval waveforms are displayed in an overlapped fashion. A trigger serves as the starting point of the displayed signal and the trigger may occur at a fixed repeating time period equal to the frequency associated with one unit interval (UI) of the data, which may correspond to the symbol transmission time. The starting point of each overlapped signal portion that includes one UI is typically controlled by the trigger. The eye pattern provides a useful tool for evaluating the effects of channel noise and inter-symbol interference (ISI) on the baseband signal to be received.

Figure 9:
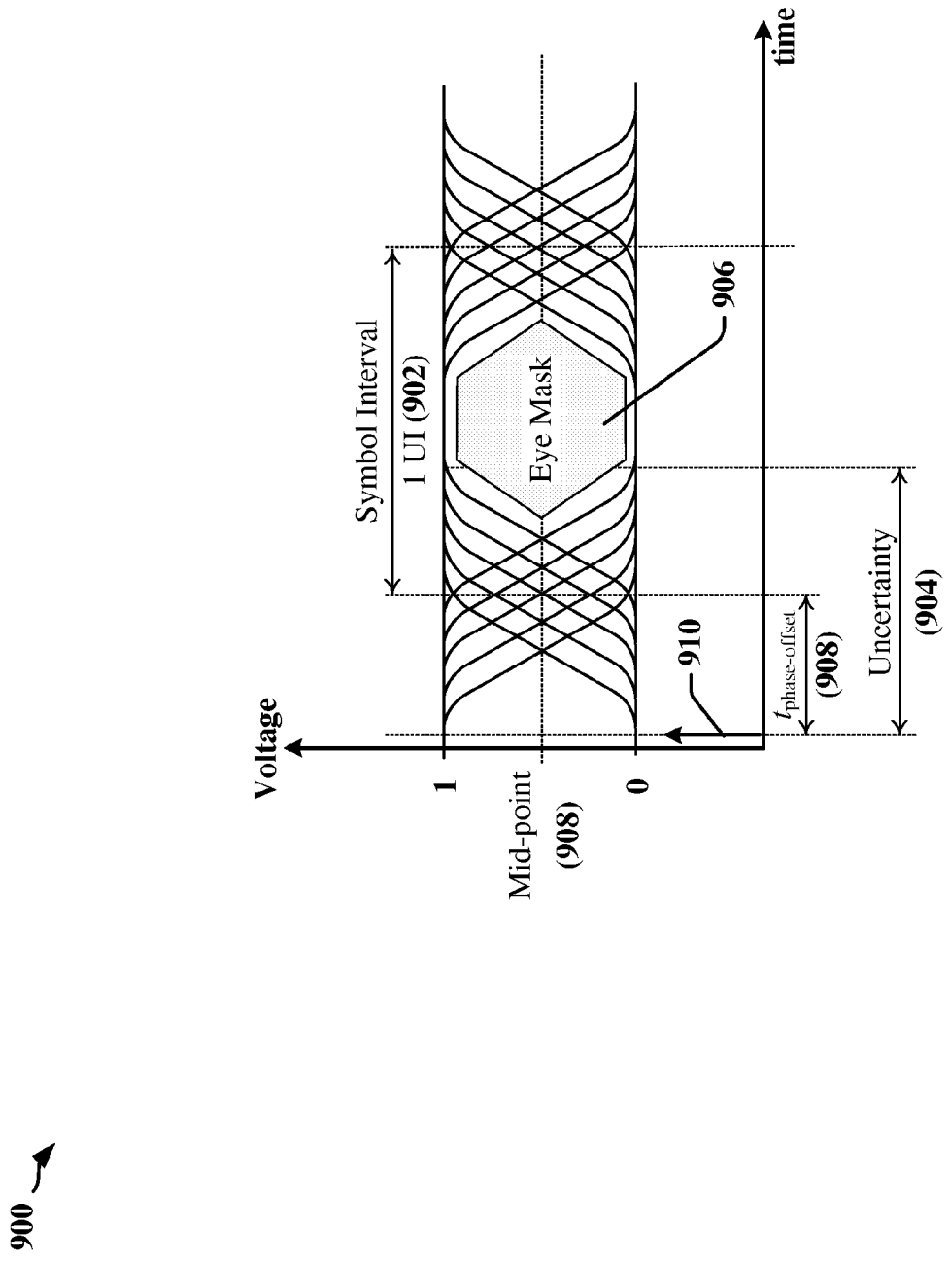
FIG. 9 includes an example of an eye pattern illustrating transition and eye regions.

FIG. 9 illustrates an eye pattern 900 generated as an overlay of multiple symbol intervals, including a symbol interval 902 that corresponds to a single UI. A signal transition region 904 represents a time period of uncertainty at the boundary between two symbols where variable signal rise times prevent reliable decoding. State information may be determined reliably in a region defined by an eye mask 906 within an "eye opening" that represents the time period in which the symbol is stable and can be reliably received and decoded. The eye mask 906 masks off a region in which zero crossings do not occur, and the eye mask is used by the decoder to prevent multiple clocking due to the effect of subsequent zero crossings at the UI boundary that follow the first signal zero crossing.

The concept of periodic sampling and display of the signal is useful during design, adaptation and configuration of systems which use a clock-data recovery circuit that re-creates the received data-timing signal using frequent transitions appearing in the received data. A communication system based on Serializer/Deserializer (SERDES) technology is an example of a system where an eye pattern 900 can be utilized as a basis for judging the ability to reliably recover data based on the opening of the "eye" in the eye pattern 900.

A trigger point 910 for a conventional eye pattern 900 may define the starting time of each waveform that is captured and displayed such that all captured waveforms overlap to display a view that shows the relative time offset 908 of all low-to-high and high-to-low transitions with respect to the ideal symbol boundary time. The ideal symbol boundaries may be defined as the crossing of the mid-point 908 for a received signal that has zero transmit clock jitter and zero ISI. The ideal symbol boundary points are the endpoints of the "1 UI" interval 902.

An M-wire N-Phase encoding system, such as a 3-wire, 3-phase encoder may encode a signal that has at least one transition at every symbol boundary and the receiver may recover a clock using those guaranteed transitions. The receiver may require reliable data immediately prior to the first signal transition at a symbol boundary, and must also be able to reliably mask any occurrences of multiple transitions that are correlated to the same symbol boundary. Multiple receiver transitions may occur due to slight differences in rise and fall time between the signals carried on the M-wires (e.g. a trio of wires) and due to slight differences in signal propagation times between the combinations of signal pairs received (e.g. A−B, B−C, and C−A outputs of differential receivers 602*a*, 602*b* and 602*c* of FIG. 6).

Figure 10:
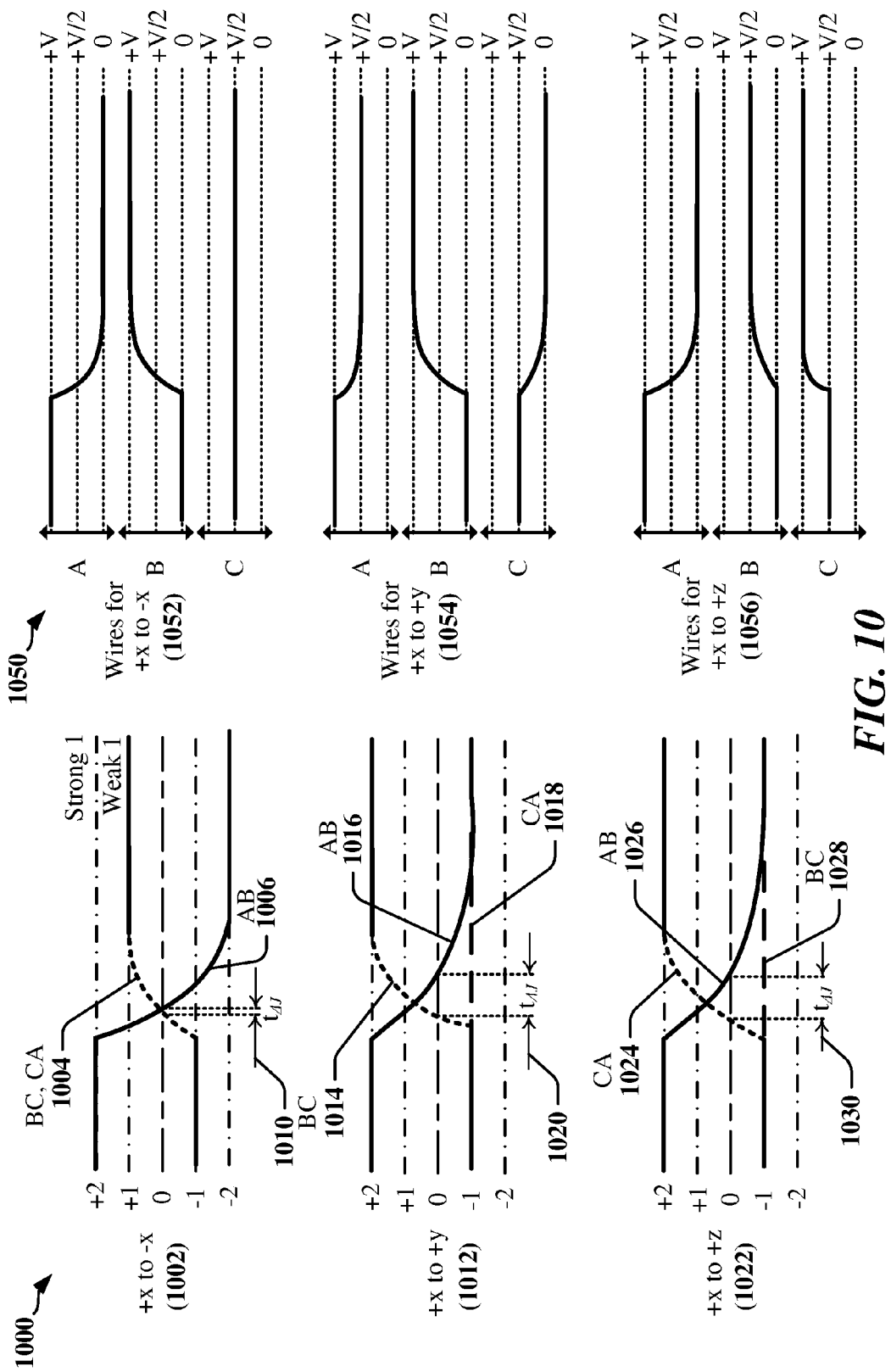
FIG. 10 includes timing charts illustrating variability of symbol transition regions in N-phase polarity encoding when multiple zero crossings occur between symbols.
Figure 11:
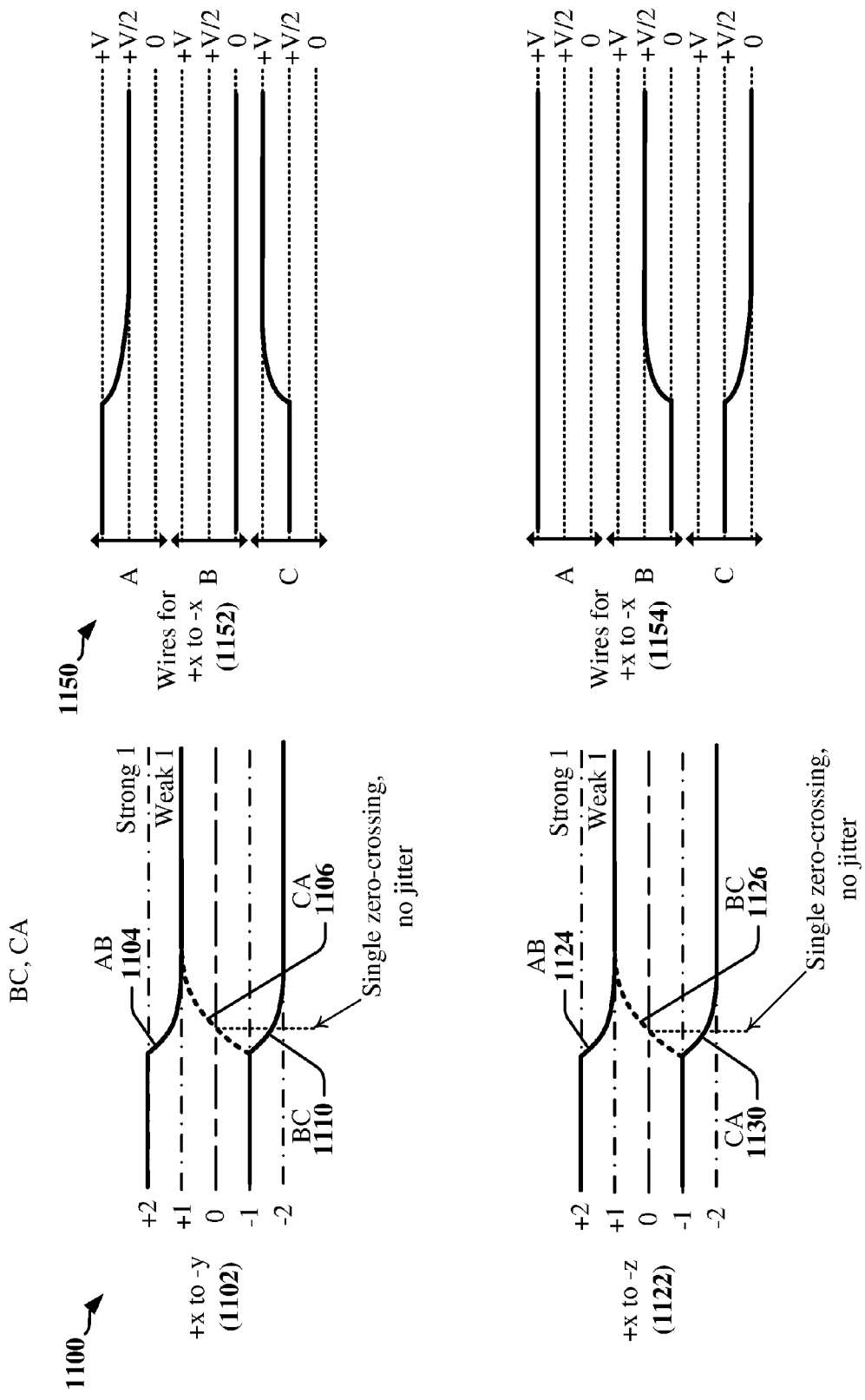
FIG. 11 includes timing charts illustrating symbol transition regions in N-phase polarity encoding when a single zero crossing occurs between symbols.

FIGS. 10 and 11 provide timing charts 1000 and 1100 representative of simplified examples of transitions from a first state to a second state and timing adjustments that may be applied to improve signaling performance. The timing charts 1000 and 1100 relate to an example of a 3-Wire, 3-Phase communications link, in which multiple receiver output transitions may occur at each UI boundary due to slight differences in rise and fall time between the three signals of the trio of wires and due to slight differences in signal propagation times between the combinations of received signal pairs (e.g. A−B, B−C, and C−A). For the purposes of this description, the signals depicted in FIGS. 10 and 11 are assumed to have no phase jitter or ISI. The initial state of a wire may be a driven state, with possible transitions to another driven state or to an undriven state. The initial state of the wire may be the undriven state, with possible transitions to a driven state.

With regard to FIG. 10, the timing charts 1002, 1012 and 1022 illustrate the differences between signal wires 310*a*, 310*b* and 310*c* (signals A, B and C, respectively) measureable at the differential receivers 602*a*, 602*b* and 602*c* before and after the signal transitions shown in the set of charts 1050. In the examples depicted in FIGS. 10 and 11, the −1 state is represented by a voltage level of 0 volts, and the +1 state is represented by a positive voltage (+V), such that the zero-crossing occurs at +V/2 volts. In many instances, a set of differential receivers 602*a*, 602*b* and 602*c* may be configured to capture transitions by comparing different combinations for two signal wires 310*a*, 310*b* and 310*c*. In one example, these differential receivers 602*a*, 602*b* and 602*c* may be configured to produce outputs by determining the difference (e.g. by subtraction) of their respective input voltages. A clock may be generated based on zero-crossings of the outputs of one or more of the differential receivers 602*a*, 602*b* and 602*c*. A zero-crossing may occur when a signal transitions through a 0 state represented by the voltage at the mid-point in a voltage range between a voltage representing a +1 state and a voltage representing a −1 state. In one example, the zero-crossing occurs at 0 volts when the −1 state is represented by a negative voltage (−V) and the +1 state is represented by a positive voltage (+V).

With reference to FIG. 10, the timing charts 1002 and 1052 relate to a transition from symbol (+x) 802 to symbol (−x) 812 (see FIG. 8) in which signal A transitions from a +1 state to a −1 state, signal B transitions from a −1 state to a +1 state and signal C remains at the 0 state. Accordingly, the differential receiver 602*a* may measure a +2 difference before the AB transition 1006 and a −2 difference after the AB transition 1006, the differential receivers 602*b* and 602*c* may each measure a −1 difference before the BC and CA transitions 1004 and a +1 difference after the BC and CA transitions 1004. In this example, both the BC and CA transitions 1004 and 1006 have zero-crossings. The zero-crossings may occur in close temporal proximity 1010 because both transitions are towards driven states.

The timing charts 1012 and 1054 relate to a transition from symbol (+x) 802 to symbol (+y) 804 in which signal A transitions from a +1 state to a 0 state, signal B transitions from a −1 state to a +1 state and signal C transitions from a 0 state to a −1 state. Accordingly, the differential receiver 602a may measure a +2 difference before the AB transition 1016 and a −1 difference after the AB transition 1016, the differential receiver 602b may measure a −1 difference before the BC transition 1014 and a +2 difference after the BC transition 1014, and the differential receiver 602c may remain at a −1 difference through the CA "non-transition" 1018. In this example, both the BC and AB transitions 1014 and 1016 have zero-crossings. These zero-crossings may be separated by a significant time interval 1020. The difference may occur because the BC transition 1014 involves two signals that have a final driven state while the AB transition 1016 relates to one signal that has a final undriven state.

The timing charts 1022 and 1056 relate to a transition from symbol (+x) 802 to symbol (+z) 806 in which signal A transitions from a +1 state to a −1 state, signal B transitions from a −1 state to a 0 state and signal C transitions from a 0 state to a +1 state. Accordingly, the differential receiver 602a may measure a +2 difference before the AB transition 1026 and a −1 difference after the AB transition 1026, the differential receiver 602b may measure a −1 difference before and after the BC non-transition 1028, and the differential receiver 602c may measure a −1 difference before the CA transition 1024 and a +2 difference after the CA transition 1024. In this example, the CA and AB transitions 1024 and 1026 have zero-crossings. These zero-crossings may be separated by a significant period of time 1030, where the difference may be attributed to the CA transition 1024 involving signals A and C that both have a final driven state while the AB transition 1026 involves one signal (the B signal) that has a final undriven state.

The time intervals 1010, 1020 and 1030 between zero-crossings may arise from differences in transition times between different combinations of states. Typically, the transition times for transitions to a driven state are shorter than transitions to an undriven state. Other circuit implementations may be employed that produce increased or decreased differences in rise times. For example, the relative time relationship of the signals at the inputs of differential receivers 602a, 602b and 602c may be affected when the zero state is a driven level rather than an undriven level, or where a undriven signal wire is terminated by pull-up and/or pull-down resistors. Thus, different timing relationships can be anticipated for signals received at the receiver inputs.

The examples illustrated in FIG. 10 describe alignment of transitions for the three state transitions +x to −x, +x to +y and +x to +z and, as shown in the timing charts 1052, 1054 and 1056, zero-crossings occur on at least two of the signal wires 310a, 310b and 310c. The conditions that occur in these three state transitions may be present in 18 of the 30 possible state transitions shown in FIG. 8.

The timing charts 1102 and 1152 of FIG. 11 relate to a transition from a first symbol (+x) 802 to a second symbol (−y) 814 in which signal A transitions from a +1 state to the 0 state (e.g. to an undriven state), signal B is unchanged at the −1 state through the transition and signal C transitions from a 0 state to a +1 state. Accordingly, the differential receiver 602a may measure a +2 difference before the AB transition 1104 and a +1 difference after the AB transition 1104, the differential receiver 602b may measure a −1 difference before the BC transition 1110 and a −2 difference after the BC transition 1110, and the differential receiver 602c may measure a −1 difference before the CA transition 1106 and a +1 difference after the CA transition 1106. In this example, only one differential receiver 602c produces an output that has a zero-crossing.

The timing charts 1122 and 1154 relate to a transition from a first symbol (+x) 802 to a second symbol (−z) 816 in which signal A remains at a +1 state, signal B transitions from the −1 state to a 0 state and signal C transitions from a 0 state to the −1 state. Accordingly, the differential receiver 602a may measure a +2 difference before the AB transition 1124 and a +1 difference after the AB transition 1124, the differential receiver 602b may measure a −1 difference before the BC transition 1126 and a −1 difference after the BC transition 1126, and the differential receiver 602c may measure a −1 difference before the CA transition 1130 and a −2 difference after the CA transition 1130. In this example, only one differential receiver 602b produces an output that has a zero-crossing.

Figure 12:
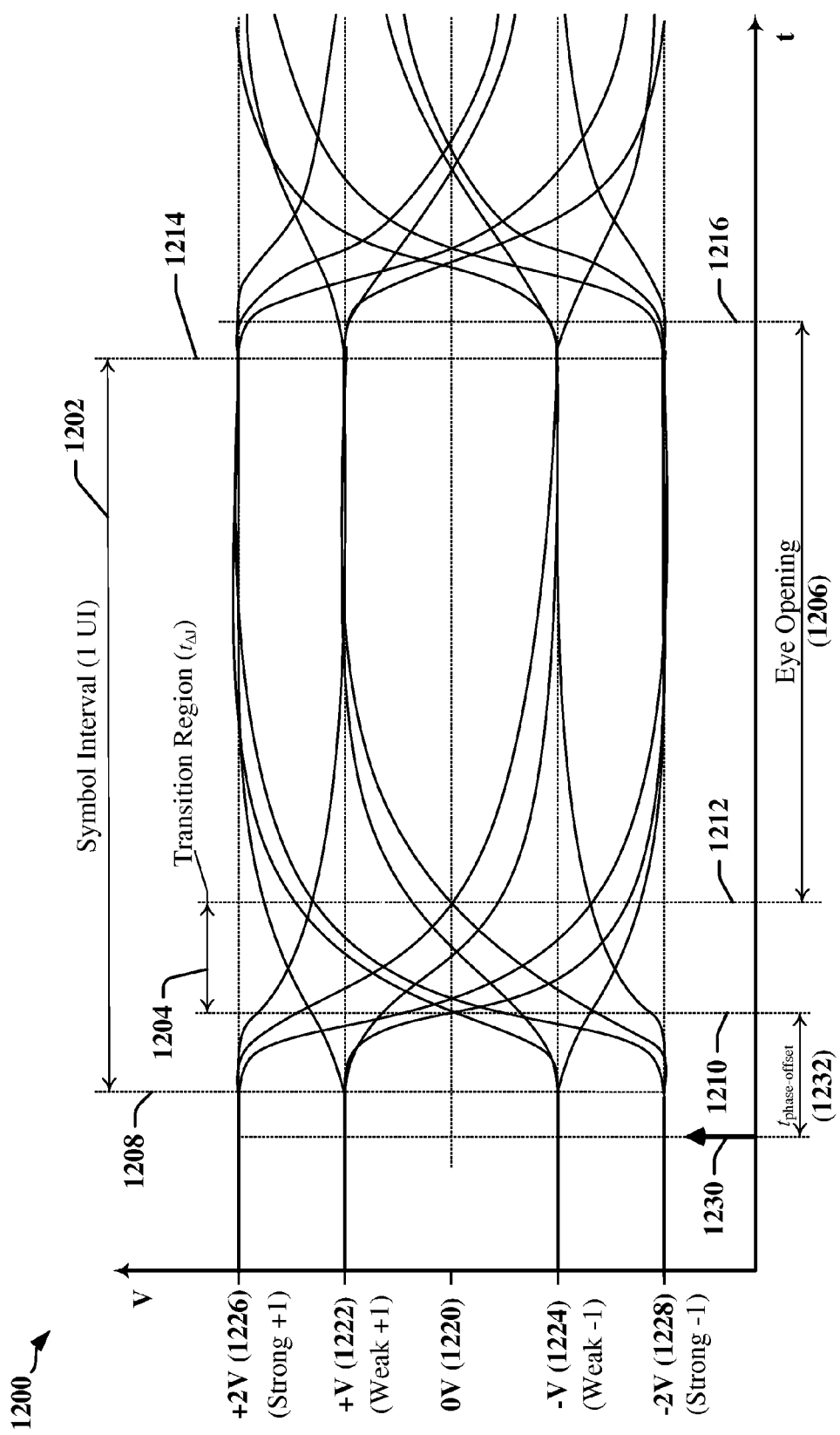
FIG. 12 is an eye pattern illustrating potential transitions in an M-wire, N-phase polarity decoder.

FIG. 12 illustrates an example of an eye-pattern 1200 generated for a 3-Phase signal.

The eye-pattern 1200 may be generated from an overlay of multiple symbol intervals 1202. The eye pattern 1200 may be produced using a fixed and/or symbol-independent trigger 1230. The eye pattern 1200 includes an increased number of voltage levels 1220, 1222, 1224, 1226, 1228 that may be attributed to the multiple voltage levels employed by a typical N-phase driver circuit. In the example, the eye pattern 1200 may represent possible transitions in 3-wire, 3-phase encoded signals provided to differential receivers 602a, 602b, and 602c. The three voltage levels may cause the differential receivers 602a, 602b, and 602c to generate strong levels 1226, 1228 and weak levels 1222, 1224 for both positive and negative polarities. Typically, only one wire 310a, 310b and 310c is undriven in any symbol and the differential receivers 602a, 602b, and 602c do not produce a 0 state (here, 0 Volts) output. The voltages associated with strong and weak levels need not be evenly spaced with respect to a 0 Volts level. For example, the weak levels 1222 1224 represent a comparison of voltages that may include the voltage level reached by an undriven signal wire 310a, 310b and 310c. The eye pattern 1200 reflects a conventional approach in which it is generally useful to overlap the waveforms produced by the differential receivers 602a, 602b, and 602c because all three pairs of signals are considered simultaneously when data is captured at the receiving device. The waveforms produced by the differential receivers 602a, 602b, and 602c are representative of three comparisons of pairs of signals (A−B, B−C, and C−A).

Drivers, receivers and other devices used in a 3-Phase decoder may exhibit different switching characteristics that can introduce relative delays between signals received from the three wires. Multiple receiver output transitions may be observed at each UI boundary 1208 and/or 1214 due to slight differences in the rise and fall time between the three signals of the trio of wires 310a, 310b, 310c and due to slight differences in signal propagation times between the combinations of pairs of received signals 310a, 310b, 310c. The eye pattern 1200 may capture variances in rise and fall times as a relative delay 1206 in transitions near each UI boundary 1208 and 1214. The variances in rise and fall times may be due to the different characteristics of the 3-Phase drivers. Differences in rise and fall times may also result in an effective shortening or lengthening of the symbol interval time 1202.

A signal transition region 1204 represents a time period of uncertainty where variable signal rise times prevent reliable decoding. State information may be reliably determined in an "eye opening" 1206 representing the time period in which the symbol is stable and can be reliably received and decoded. In one example, the eye opening 1206 may be determined to begin at the end 1212 of the signal transition region 1204, and end at the termination 1214 of the symbol interval 1202. In the example depicted in FIG. 12, the eye opening 1206 may be determined to begin at the end 1212 of the signal transition region 1204, and end at a time 1216 when the signaling state of the connectors 310a, 310b, 310c and/or the outputs of the three differential receivers 602a, 602b and 602c have begun to change to reflect the next symbol.

The maximum speed of a communication link 220 configured for N-Phase encoding may be limited by the duration of the signal transition region 1204 compared to the received signal eye opening 1206. The minimum period for the symbol interval 1202 may be constrained by tightened design margins associated with the CDR circuit 524 in the decoder 500 illustrated in FIG. 5, or in the clock generation circuit 606 of FIG. 6, for example. Different signaling state transitions may be associated with different variations in signal transition times corresponding to two or more wires 310a, 310b and/or 310c, thereby causing the outputs of the differential receivers 602a, 602b and 602c in the receiving device to change at different times and/or rates with respect to the symbol boundary 1208, where the inputs 310a, 310b, 310c to the differential receivers 602a, 602b and 602c begin to change. A delay element may be provided in the CDR circuit 524 to accommodate possible large variations in received signal transition times at the outputs of two or more of the differential receivers 602a, 602b and 602c. The delay element may be provided in one or more of the state change-detect circuit 604 and/or the clock generation circuit 606 shown in FIG. 6. In one example, the delay element may have a minimum delay period that exceeds the transition region time 1204. The maximum delay time provided by this delay element may not extend beyond the closing edge 1216 of the eye opening 1206. In some instances, the maximum delay time provided by the delay element may not extend beyond the commencement of the next symbol interval at time 1214. At faster data rates, the eye opening 1206 can become small in comparison to the symbol interval 1202 and the effect of symbol transition variability may be determinative of the maximum symbol transmission rate.

The duration of any single transition is unlikely to span the full range of the signal transition region ($t_{AJ}$) 1204, since it is unlikely that a minimum possible signal transition time and a maximum possible transition time occurs during a single symbol transition. In one example, the signal transition region 1204 may be bounded by the time of the first zero crossing 1210 detected at the output of a differential receiver 602a, 602b, or 602c and the time of the last zero crossing 1212 detected at the output of a differential receiver 602a, 602b, or 602c, for all possible symbol transitions. The transition times observed at the outputs of the differential receiver 602a, 602b, and 602c may correspond to the times taken for the voltage at the connectors and/or wires 310a, 310b or 310c to reach a signaling state after a change in one or more inputs of the drivers 308 in a transmitter.

The longest possible transition time may be determined by the characteristics of the signal wire and/or connector 310a, 310b or 310c and the type of state transition involved. In one example, the longest possible transition time may be determined by the rise or fall time of one or more signals. Rise and fall times may be determined by the nature and voltage levels of the original and/or the final states. Typically, the longest possible transition time corresponds to a transition between an actively driven state and an undriven state.

A high value of $t_{AJ}$ for the transition region 1204 relative to the symbol interval 1202 can result in increased design difficulty associated with the CDR circuit 524 or clock generation circuit 606. For example, the clock generation circuit 606 may employ a delay element or timer that is triggered by the first zero crossing of the three differential receiver outputs 602a, 602b and 602c. The state of the outputs of all three differential receivers 602a, 602b and 602c may not be safely sampled until all of the differential receivers 602a, 602b and 602c have reached their final state, which may be defined by the end 1212 of the transition region. Accordingly, the timer may preferably expire shortly after the end 1212 of the transition region 1204, at which time the clock generation circuit 606 may output a clock edge that is used to sample the outputs of the three differential receivers 602a, 602b and 602c.

In some devices, delay elements in the CDR circuit 524 can be afflicted by variations in manufacturing process, circuit supply voltage, and die temperature (PVT variation), and may generate delays that vary significantly. In such systems, the nominal operating condition of the CDR circuit 524 is generally set by design to generate a clock edge somewhere in the middle of the eye opening 1206 in order to ensure that a clock edge occurs after the end 1212 of the transition region 1204 and prior to the commencement 1216 of the transition region to the next symbol, even under worst case PVT effects. Difficulty can arise in designing a CDR circuit 524 that guarantees a clock edge within the eye opening 1206 when the transition region 1204 is large compared to the eye opening 1206. For example, a typical delay element may produce a delay value that changes by a factor of 2 over all PVT conditions, and the eye opening 1206 must be larger than the transition region 1204 in order that a non-adjustable delay value can be chosen.

In some instances, the duration of the transition region 1204 may be calculated based on the maximum timing between a change in input to one or more drivers 308 of a transmitting circuit (see FIG. 3) and corresponding transitions observed or expected at the outputs of differential receivers 502 in a receiver (see FIG. 5). In other instances, a modified transition region 1216 may be determined at the outputs of the receivers 502 as the maximum difference between the time 1218 of a first transition at the output of one of the receivers 502 and the time 1214 of the last transition at the output of the other receivers 502, for all symbol transitions.

Figure 13:
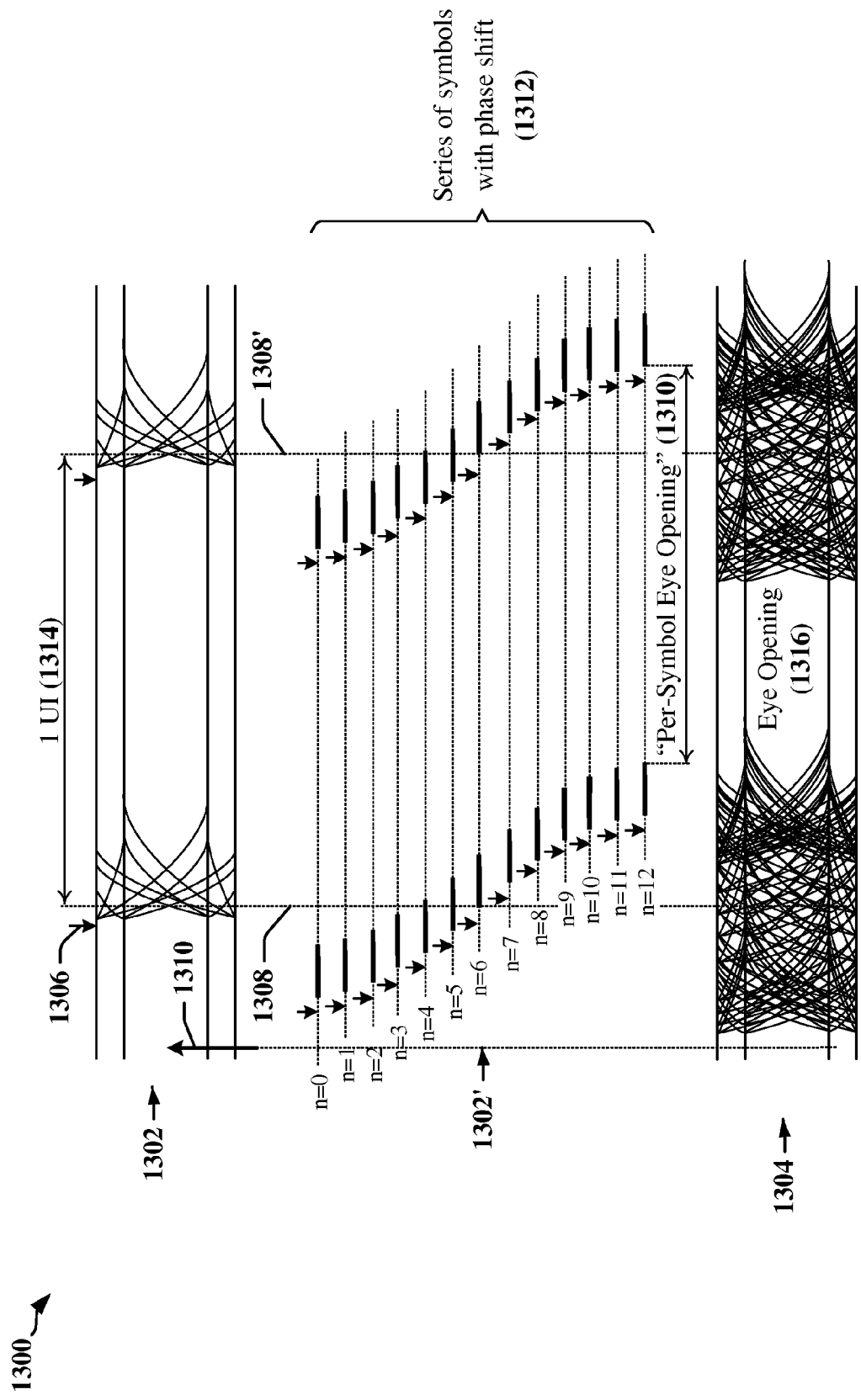
FIG. 13 is an eye pattern illustrating symbol transition and eye regions related to an M-wire, N-phase polarity communications link when the transmit clock is modulated with a phase shifting signal.

FIG. 13 is a diagram 1300 illustrating the effect of phase jitter on a conventional eye pattern 1304 for a 3-wire, 3-phase signal captured using a fixed trigger point 1310. An eye pattern 1302 for a first symbol (n=6) 1302 received at a receiver may have a "1 UI" symbol interval 1314. A sampling point 1306 for the prior symbol may be defined in relation to the beginning of the transition to the first symbol 1302. The effect of phase variations can be observed in a series of symbols (n=0 through n=12) 1312. The movement of the transition points from one UI to the next may be attributed to small changes in the length of the UI due to transmit clock jitter, for example. In the depicted example, the phase shift is generally characterized as a sinusoid, and the eye pattern 1304 for the combined series of symbols 1312 shows a significantly decreased eye opening 1316 with respect to the available eye opening 1310 for each symbol.

In the illustrated example, the impact of random jitter on the eye pattern 1304 derives from a link transmit clock frequency that is modulated at a frequency $\frac{1}{24}$ of the UI rate. The maximum difference in the UI 1314 may be determined as the amplitude of deviation from the mean (A) and the number of UIs 1314 in a full cycle of the modulation. In one example, the maximum deviation may be calculated as:

peak_deviation_in_one_UI=$A$*sin($2\pi$/UI_per_cycle).

In the example shown in FIG. 13, the duration of the UI 1314 can be graphed as a distance of approximately 8.25 centimeters, while the peak deviation in a cycle is graphed at approximately 1.75 centimeters. There are 24 UIs in each cycle of the variance, and A=1.75/8.25=0.2121 UI.

peak_deviation_in_one_UI=0.2121*sin($2\pi$/24)= 0.0549.

In the example, therefore, the peak deviation between symbols is about 5.5% of the UI 1314. The cumulative effect of this change in the phase of the beginning 1308 and ending 1308' of the UI 1314 from cycle to cycle with respect to the ideal trigger point 1310 causes the eye opening 1316 to close by a significant amount with respect to the available per-symbol eye opening 1310. The available per-symbol eye opening 1310 may be significantly larger for each symbol 1312 than the opening 1316 presented in a conventional eye pattern due to jitter in the clock signal. Clock edges in an M-wire, N-phase communications link may be generated independently for each symbol 312, and a sample point 1306 may be derived from such independently generated clock in a manner that takes advantage of the full per-symbol eye opening 1310. In the example, data may be sampled at a sample point 1306 provided shortly before the occurrence of the first edge detected at the symbol transition 1308 and/or 1308'.

When the concept of multiple receiver transitions near each UI boundary 1308 and 1308' is combined with phase jitter of the transmitter clock and ISI then the eye opening 1316 can appear to be nearly or even completely closed, although in operation the 3-Phase receiver may have more than sufficient timing margin in the per-symbol eye opening 1310 to reliably capture the signal. The actual timing margin is not typically based on a trigger 1310 that is unrelated to the symbol 1302, but may be based on the 3-Phase recovered clock that is derived from the signal transitions at every symbol boundary 1308 and 1308' such that only the cycle-to-cycle effects on the per-symbol eye opening 1310 are significant.

Figure 14:
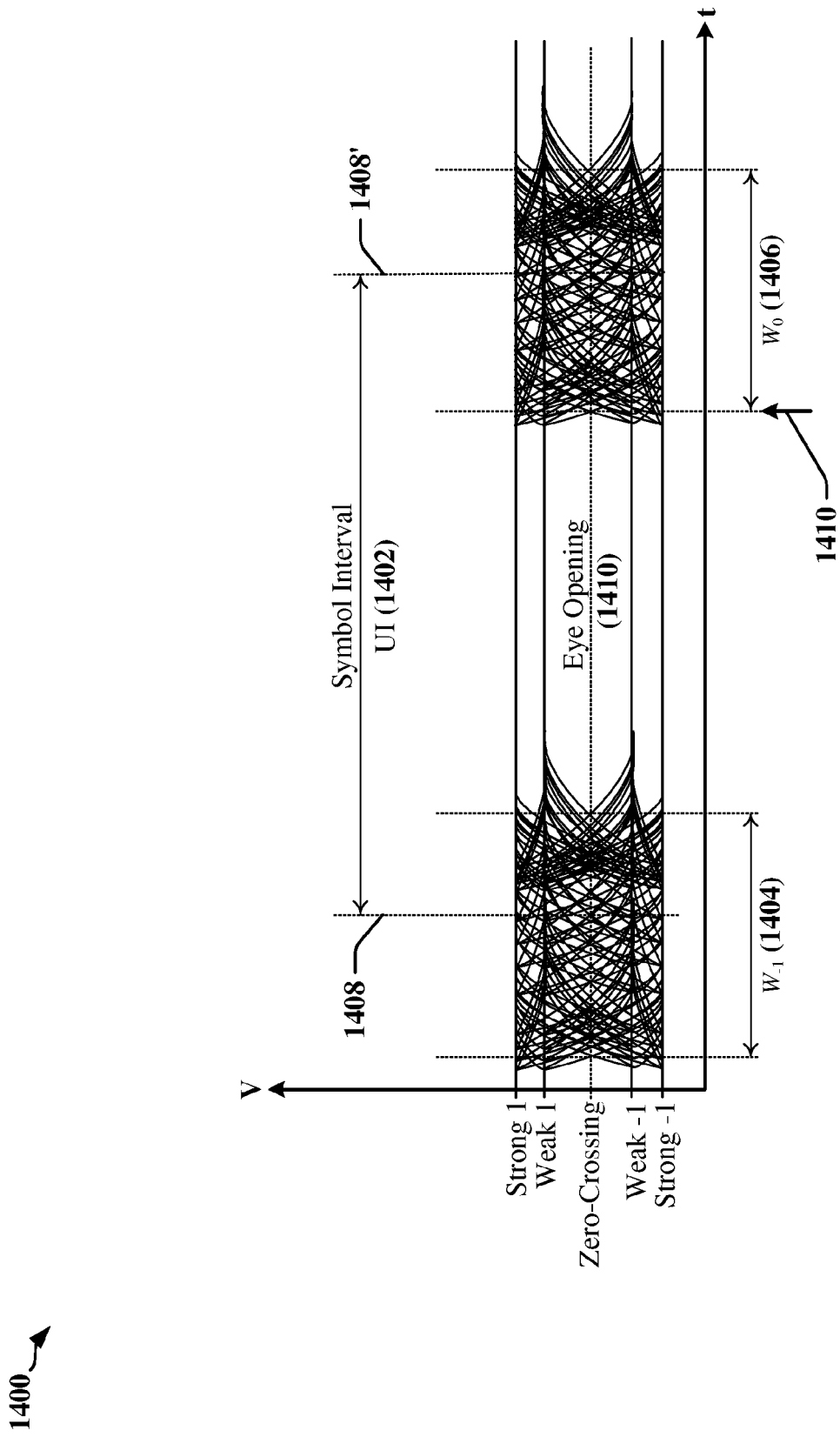
FIG. 14 is an eye pattern illustrating certain aspects of the symbol transition and eye regions in an M-wire, N-phase polarity decoder where the transmit clock is modulated with a phase shifting signal.

FIG. 14 provides a timing chart 1400 that illustrates a 3-Phase eye-pattern triggered at or near the data capture point 1410 generated by an N-phase decoder. The data capture point 1410 occurs at an instant in time prior to the first transition at the UI boundary 1408' detected by the receiver. The 3-Phase eye pattern may be aligned and/or synchronized to the data capture point 1410 which is determined based on first zero crossing of any of the three waveforms (A–B, B–C, and C–A) of the differential receivers 602a, 602b and 602c, where the zero crossings occur at a UI boundary 1408 and/or 1408'. As illustrated, the trigger point 1410 is on the left side of the left side of the $t_{AJ}$ intervals 1010, 1020 and 1030 shown in FIG. 10.

The UI 1402 is bounded at the beginning and end by one or more differential signal transitions that pass through the differential zero signal level (zero crossing). In a 3-Phase system these differential waveforms, A–B, B–C, and C–A are all considered together. Time window $W_{-1}$ 1404 defines the region in which the signal differences have a zero crossing (i.e., cross the mid-point 1410) at the beginning of the UI 1402, and time window $W_0$ 1406 is the region where the signal differences have a zero crossing at the end of the UI 1402. The first signal difference of the group A–B, B–C, and C–A that has a zero crossing in time window $W_0$ 1406 defines the trigger point 1410. The eye pattern is produced by overlapping the time domain waveforms of multiple UI periods where the trigger points 1410 of all waveforms are aligned at the same point in time in the displayed eye pattern. The trigger point may be set as the data sampling point, the first detected transition and/or the first zero-crossing of an output of the differential receivers 602a, 602b, and 602c.

Typically, an N-Phase clock recovery and data sampling circuit is sensitive only to cycle-to-cycle events and it is possible for a conventional eye pattern display to provide misleading information. For example, the eye may appear to be completely closed even when each individual cycle, or UI 1402 of the data signal has a large amount of timing margin to sample the data just prior to the first transition of the data signal that marks the UI boundary 1408 and/or 1408'. The 3-Phase clock recovery circuit and data capture circuit is mostly unaffected by this eye closure because the clock recovery circuit may generate a sample clock that results in a capture point 1410 just prior to the first transition near a UI boundary 1408 and/or 1408'. A conventional data capture circuit for a SERDES-based system may use a PLL to recover the clock and generally requires that capture occurs in the middle of the eye opening. However, a 3-Phase data capture circuit and data sampling circuit can adjust the sampling point 1410 at every UI boundary 1408 and 1408' in order to sample the received data at the ideal moment, which results in a large or optimized data setup time for the data capture circuit. The recovery circuit need only detect the first edge at a UI boundary 1408 and/or 1408' and trigger a delay circuit to mask any subsequent receiver transitions near the same UI boundary 1408 and/or 1408'.

An N-Phase eye pattern disclosed herein may be used for the observation of the data sampling and clock recovery margin of N-Phase signals. The disclosed N-Phase eye pattern mimics the behavior of the clock recovery and data capture circuit in order to observe the timing margin available for the data sampling circuit and the amount of delay required for the timing mask in the clock recovery circuit. This disclosed N-Phase eye pattern definition can be used by N-Phase test equipment to display a new type of eye pattern, which the equipment user may view and interpret. For the purposes of this disclosure, certain aspects of the disclosed N-Phase eye pattern are described with respect to a 3-Phase encoded communications link. An N-Phase eye pattern for corresponding to a communications link that uses more than 3 wires may have more than 4 levels in the eye pattern. However, certain principles and aspects described herein, including those principles and aspects related to the timing and capture of the first zero-crossing transition at the UI boundary, and the use of the first zero-crossing transition as a trigger are equally applicable in the communications link that uses more than 3 wires.

Figure 15:
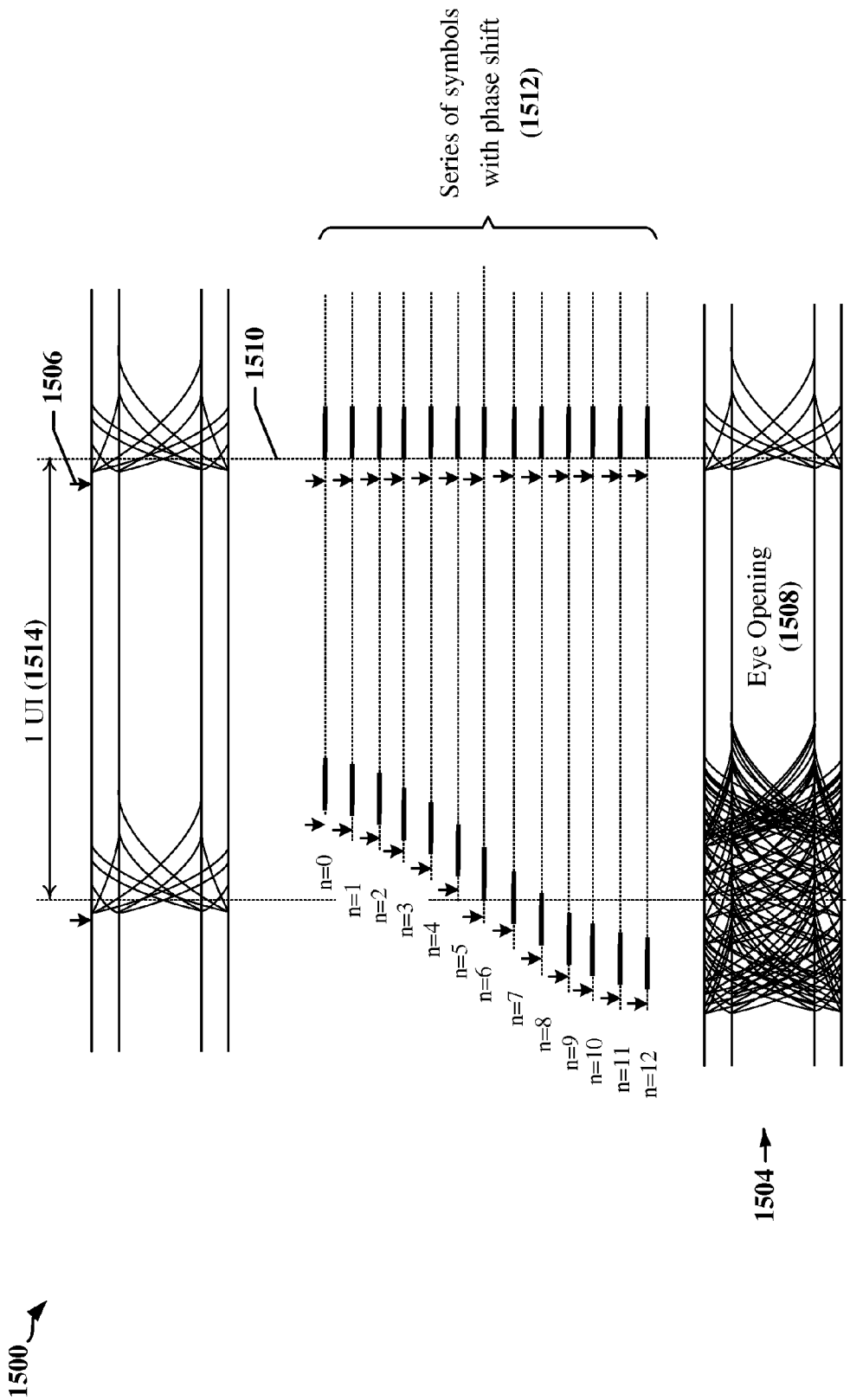
FIG. 15 is a first example of an eye pattern for an M-wire, N-phase polarity communications link adapted according to certain aspects disclosed herein.

FIG. 15 illustrates an example 1500 of a 3-Phase eye pattern 1504 according to certain aspects disclosed herein. The eye pattern 1504 corresponds to the same waveform that was plotted as a conventional eye pattern 1304 in FIG. 13. The eye pattern 1504 is plotted using a 3-Phase eye pattern algorithm described herein, and reveals a substantially larger eye opening 1508. In the example 1500, the eye pattern 1504 may be generated using as a trigger, the sampling clock 1506 employed by an N-Phase decoder, which may be generated slightly before the occurrence of a first transition at the end of a UI 1514. In some examples, the eye pattern 1504 may be aligned on the first transition 1510 at the end of a UI 1514, rather than at the sampling point 1506. Triggering based on the sampling point 1506 is illustrated in FIG. 15 because it can provide a convenient time reference when considering the operation of a data capture circuit. The eye pattern 1504 offers a true representation of the data setup time that is presented to the data sampling circuit in an N-Phase receiver.

Figure 16:
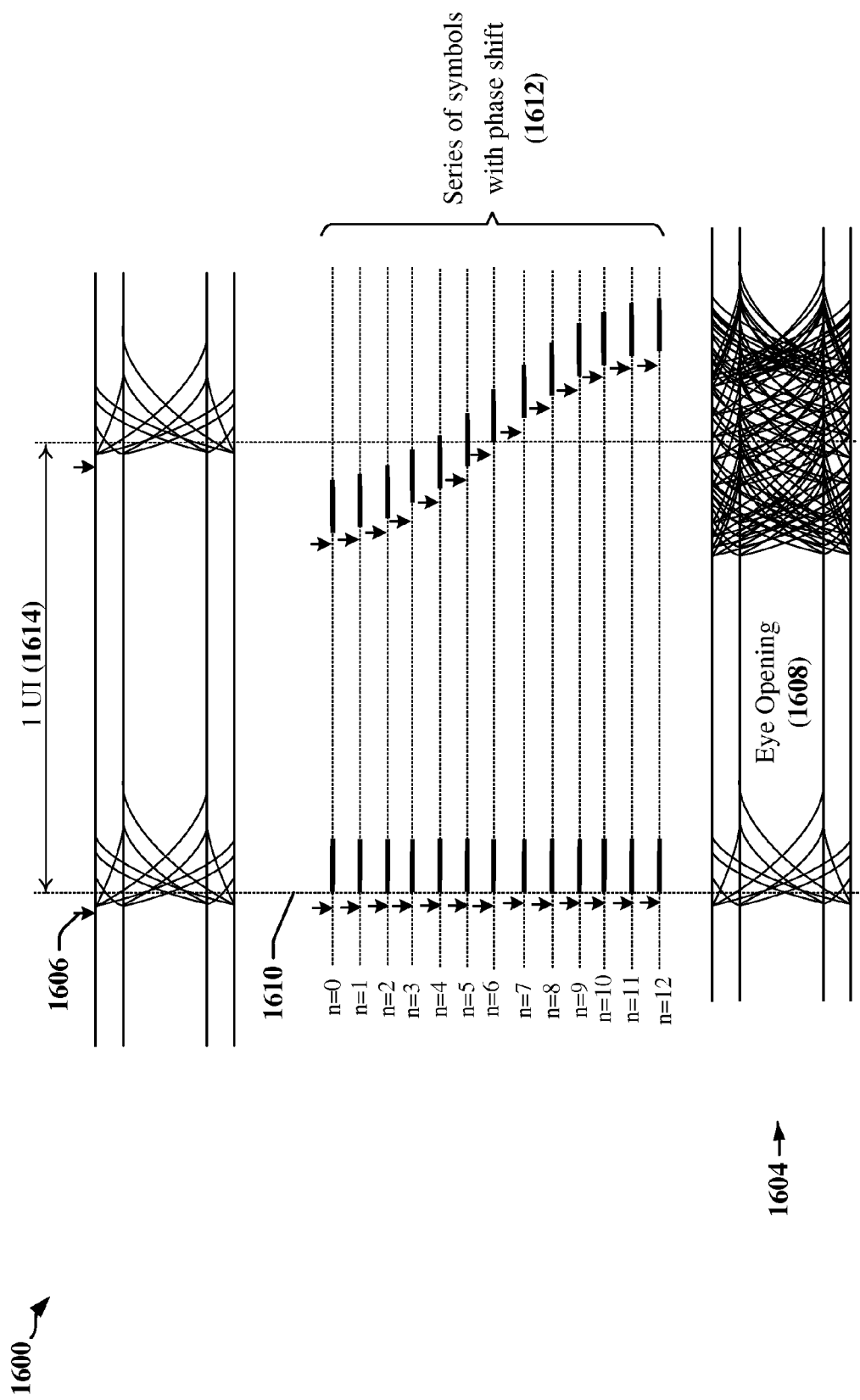
FIG. 16 is a second example of an eye pattern for an M-wire, N-phase polarity communications link adapted according to certain aspects disclosed herein.

FIG. 16 is a diagram 1600 illustrating an example of a 3-Phase eye pattern 1604 generated according to certain aspects disclosed herein. The eye pattern 1604 may superimpose symbol intervals 1614 for a series of symbols 1612 using a trigger that is derived from the first signal zero crossing 1610 at the beginning of the UI 1614, with the remaining part of the waveform displayed following the trigger point. In some examples, the eye pattern 1604 may superimpose symbol intervals 1614 for a series of symbols 1612 using a trigger that is derived from the sampling point 1606 calculated or otherwise generated for sampling data in a prior UI. In this form of the display, it is possible to observe the time margin provided by the eye opening 1608 for a clock delay mask in the clock recovery circuit. This clock delay mask may be used to prevent multiple clocking by masking the effect of subsequent zero crossings at the UI boundary that follow the first signal zero crossing 1610.

Figure 17:
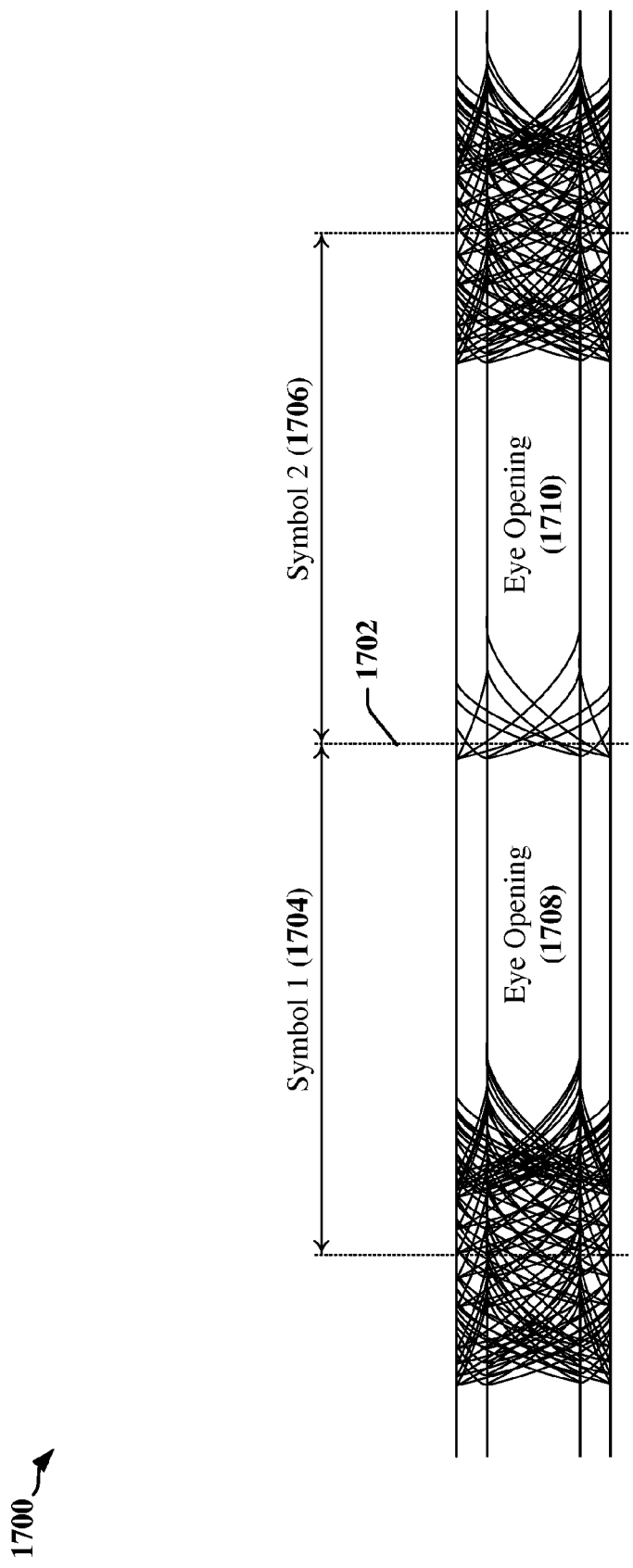
FIG. 17 is an example of an eye pattern for a multi-symbol eye pattern optimized according to certain aspects disclosed herein.

FIG. 17 illustrates an example of a multi-symbol 3-Phase eye pattern 1700 generated according to certain aspects disclosed herein. The multi-symbol 3-Phase eye pattern 1700 may superimpose symbol intervals for a series of sequential symbol pairs using a trigger that is derived from the first signal zero crossing 1702 between the first symbol 1704 and the second symbol 1706 of each symbol pair. The multi-symbol 3-Phase eye pattern 1700 combines the two forms of eye patterns shown in FIGS. 15 and 16. Accordingly, the eye opening 1708 before the trigger point 1702 and the eye opening 1710 following the trigger point 1702 may be observed simultaneously. This dual-eye configuration may be referred to as a "sunglasses pattern."

While the examples presented in this disclosure relate primarily to 3-Wire, 3-Phase communications links, the techniques, algorithms, circuits and methods described are applicable to other encoding schemes, and eye patterns may be generated for M-Wire, N-Phase and N-Factorial (N!), for example. In some instances, algorithms may be extended and/or adapted to match the clock generation and data sampling circuits used for these different encoding schemes. For example, algorithms and circuits according to certain aspects of this disclosure may be adapted to identify the first signal zero crossing that defines the trigger point in the presence of greater numbers of level strengths in the waveform. In one example, the algorithms and circuits may be adapted to accommodate multiple version of strong ±1 states, multiple version of weak ±1 states, as well as weak 0 states and strong 0 states in an N-Phase waveform.

Figure 18:
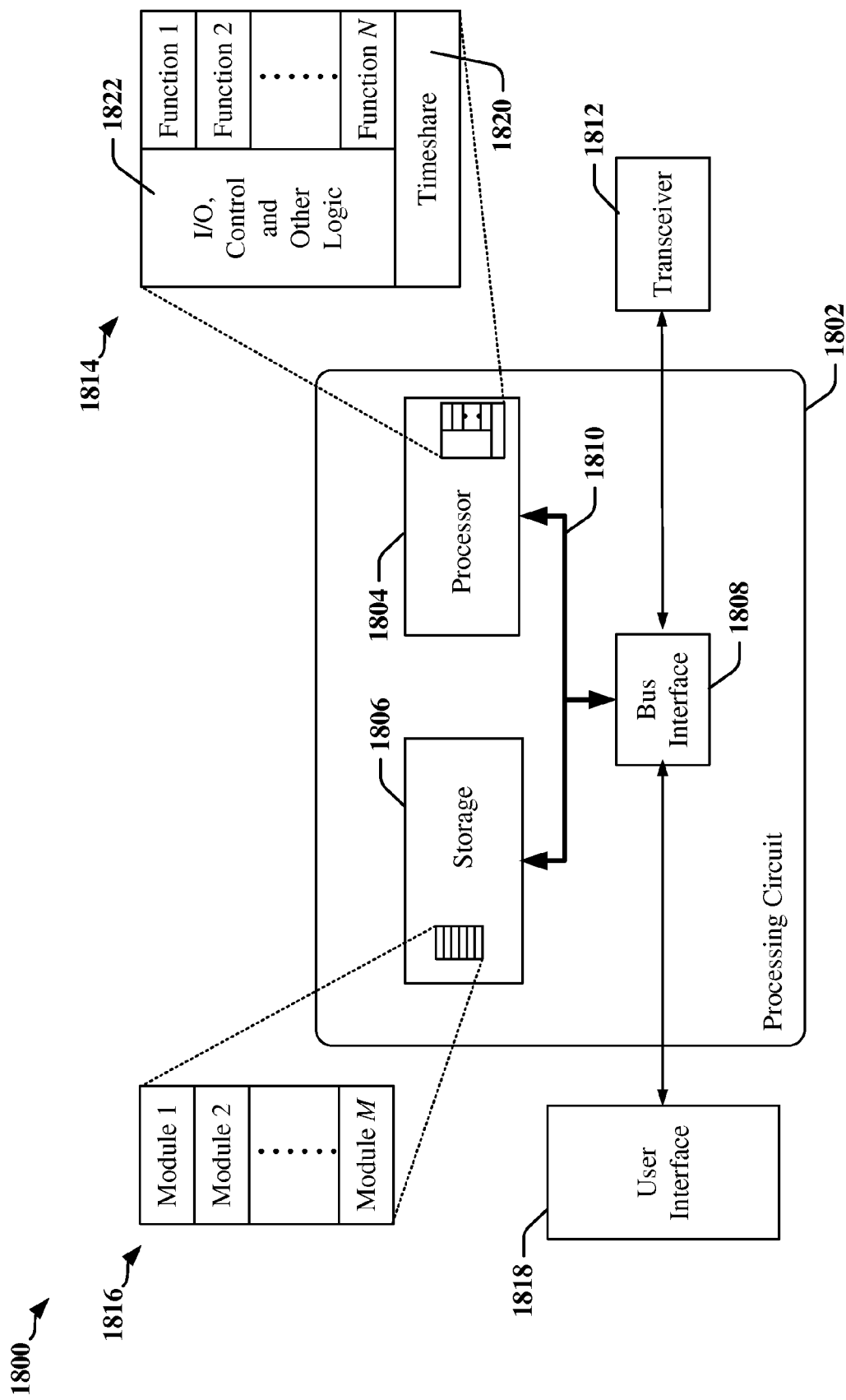
FIG. 18 is a block diagram illustrating an example of an apparatus employing a processing circuit that may be adapted according to certain aspects disclosed herein.

FIG. 18 is a conceptual diagram 1800 illustrating a simplified example of a hardware implementation for an apparatus employing a processing circuit 1802 that may be configured to perform one or more functions disclosed herein. In accordance with various aspects of the disclosure, an element, or any portion of an element, or any combination of elements as disclosed herein may be implemented using the processing circuit 1802. The processing circuit 1802 may include one or more processors 1804 that are controlled by some combination of hardware and software modules. Examples of processors 1804 include microprocessors, microcontrollers, digital signal processors (DSPs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 1804 may include specialized processors that perform specific functions, and that may be configured, augmented or controlled by one of the software modules 1816. The one or more processors 1804 may be configured through a combination of software modules 1816 loaded during initialization, and further configured by loading or unloading one or more software modules 1816 during operation.

In the illustrated example, the processing circuit 1802 may be implemented with a bus architecture, represented generally by the bus 1810. The bus 1810 may include any number of interconnecting buses and bridges depending on the specific application of the processing circuit 1802 and the overall design constraints. The bus 1810 links together various circuits including the one or more processors 1804, and storage 1806. Storage 1806 may include memory devices and mass storage devices, and may be referred to herein as computer-readable media and/or processor-readable media. The bus 1810 may also link various other circuits such as timing sources, timers, peripherals, voltage regulators, and power management circuits. A bus interface 1808 may provide an interface between the bus 1810 and one or more transceivers 1812. A transceiver 1812 may be provided for each networking technology supported by the processing circuit. In some instances, multiple networking technologies may share some or all of the circuitry or processing modules found in a transceiver 1812. Each transceiver 1812 provides a means for communicating with various other apparatus over a transmission medium. Depending upon the nature of the apparatus, a user interface 1818 (e.g., keypad, display, speaker, microphone, joystick) may also be provided, and may be communicatively coupled to the bus 1810 directly or through the bus interface 1808.

A processor 1804 may be responsible for managing the bus 1810 and for general processing that may include the execution of software stored in a computer-readable medium that may include the storage 1806. In this respect, the processing circuit 1802, including the processor 1804, may be used to implement any of the methods, functions and techniques disclosed herein. The storage 1806 may be used for storing data that is manipulated by the processor 1804 when executing software, and the software may be configured to implement any one of the methods disclosed herein.

One or more processors 1804 in the processing circuit 1802 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1806 or in an external computer readable medium. The external computer-readable medium and/or storage 1806 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium and/or storage 1806 may also include, by way of example, a carrier wave, a transmission line, and any other suitable medium for transmitting software and/or instructions that may be accessed and read by a computer. Computer-readable medium and/or the storage 1806 may reside in the processing circuit 1802, in the processor 1804, external to the processing circuit 1802, or be distributed across multiple entities including the processing circuit 1802. The computer-readable medium and/or storage 1806 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1806 may maintain software maintained and/or organized in loadable code segments, modules, applications, programs, etc., which may be referred to herein as software modules 1816. Each of the software modules 1816 may include instructions and data that, when installed or loaded on the processing circuit 1802 and executed by the one or more processors 1804, contribute to a run-time image 1814 that controls the operation of the one or more processors 1804. When executed, certain instructions may cause the processing circuit 1802 to perform functions in accordance with certain methods, algorithms and processes described herein.

Some of the software modules 1816 may be loaded during initialization of the processing circuit 1802, and these software modules 1816 may configure the processing circuit 1802 to enable performance of the various functions disclosed herein. For example, some software modules 1816 may configure internal devices and/or logic circuits 1822 of the processor 1804, and may manage access to external devices such as the transceiver 1812, the bus interface 1808, the user interface 1818, timers, mathematical coprocessors, and so on. The software modules 1816 may include a control program and/or an operating system that interacts with interrupt handlers and device drivers, and that controls access to various resources provided by the processing circuit 1802. The resources may include memory, processing time, access to the transceiver 1812, the user interface 1818, and so on.

One or more processors 1804 of the processing circuit 1802 may be multifunctional, whereby some of the software modules 1816 are loaded and configured to perform different functions or different instances of the same function. The one or more processors 1804 may additionally be adapted to manage background tasks initiated in response to inputs from the user interface 1818, the transceiver 1812, and device drivers, for example. To support the performance of multiple functions, the one or more processors 1804 may be configured to provide a multitasking environment, whereby each of a plurality of functions is implemented as a set of tasks serviced by the one or more processors 1804 as needed or desired. In one example, the multitasking environment may be implemented using a timesharing program 1820 that passes control of a processor 1804 between different tasks, whereby each task returns control of the one or more processors 1804 to the timesharing program 1820 upon completion of any outstanding operations and/or in response to an input such as an interrupt. When a task has control of the one or more processors 1804, the processing circuit is effectively specialized for the purposes addressed by the function associated with the controlling task. The timesharing program 1820 may include an operating system, a main loop that transfers control on a round-robin basis, a function that allocates control of the one or more processors 1804 in accordance with a prioritization of the functions, and/or an interrupt driven main loop that responds to external events by providing control of the one or more processors 1804 to a handling function.

Figure 19:
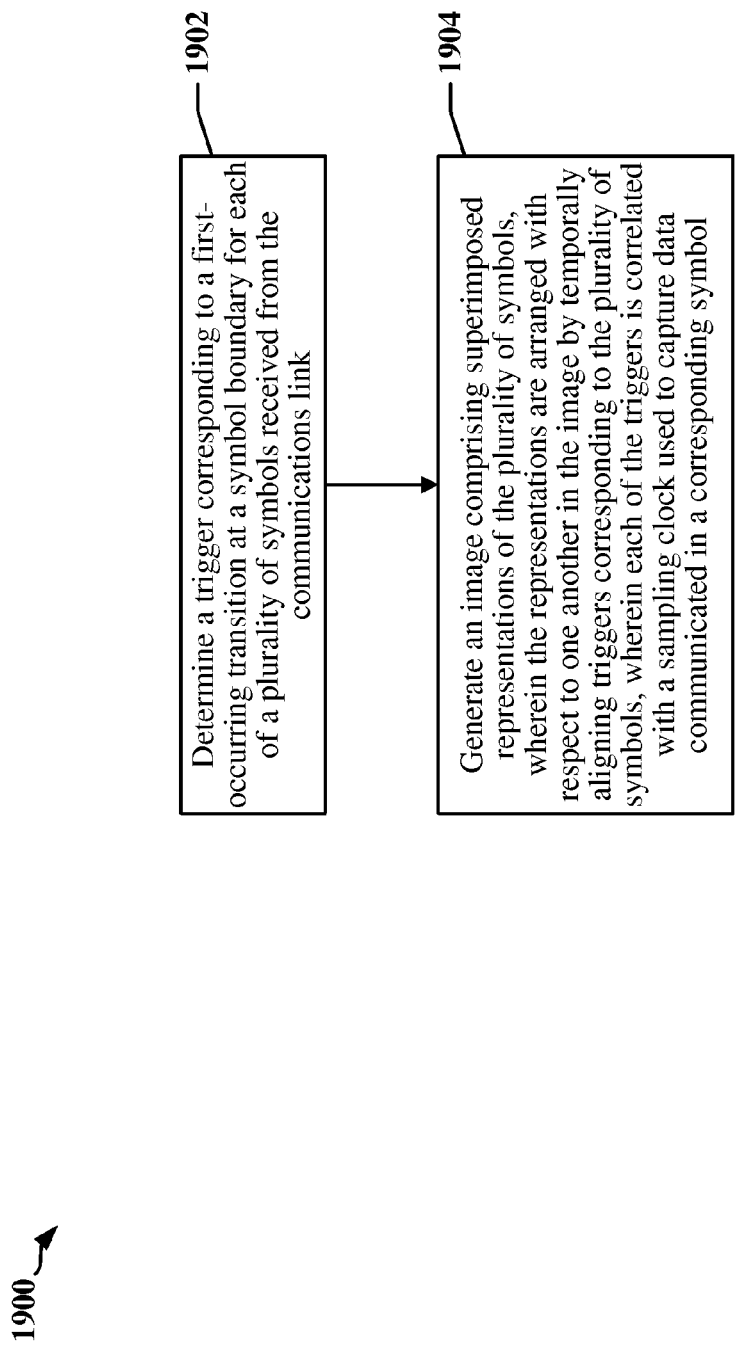
FIG. 19 is a flow chart of a method for generating an eye pattern describing an M-wire N-phase signal according to certain aspects disclosed herein.

FIG. 19 is a flowchart illustrating an encoding method according to certain aspects of the invention. The method may be performed by a diagnostics or test device. At step 1902, the device may determine a trigger corresponding to a first transition at a symbol boundary for each of a plurality of symbols received sequentially from the communications link.

At step 1904, the device may provide an image that superimposes representations of the plurality of symbols one upon another. The representations may be arranged with respect to one another in the image by temporally aligning triggers determined for the plurality of symbols. Each trigger may be correlated with a sampling clock used to capture data communicated in a corresponding symbol.

In an aspect of the disclosure, the symbol boundary occurs at the end of the each symbol. The symbol boundary may alternatively occur at the beginning of the each symbol. The first transition may include a first zero-crossing of a signal corresponding to, or calculated to be output by one of a plurality of differential receivers in a receiver. The first zero-crossing of the signal may be estimated, calculated or generated by circuits or differential probes. The signals may transition between three or more voltage states. A difference in state between two wires in the communications link may be determined. The communications link may include an M-wire, N-phase decoder such as a 3-wire, 3-phase decoder, or an N-factorial decoder.

In an aspect of the disclosure, each trigger may be correlated with an edge of the sampling clock that is used to capture information from a delayed version of the symbol. The image may include an eye pattern.

Figure 20:
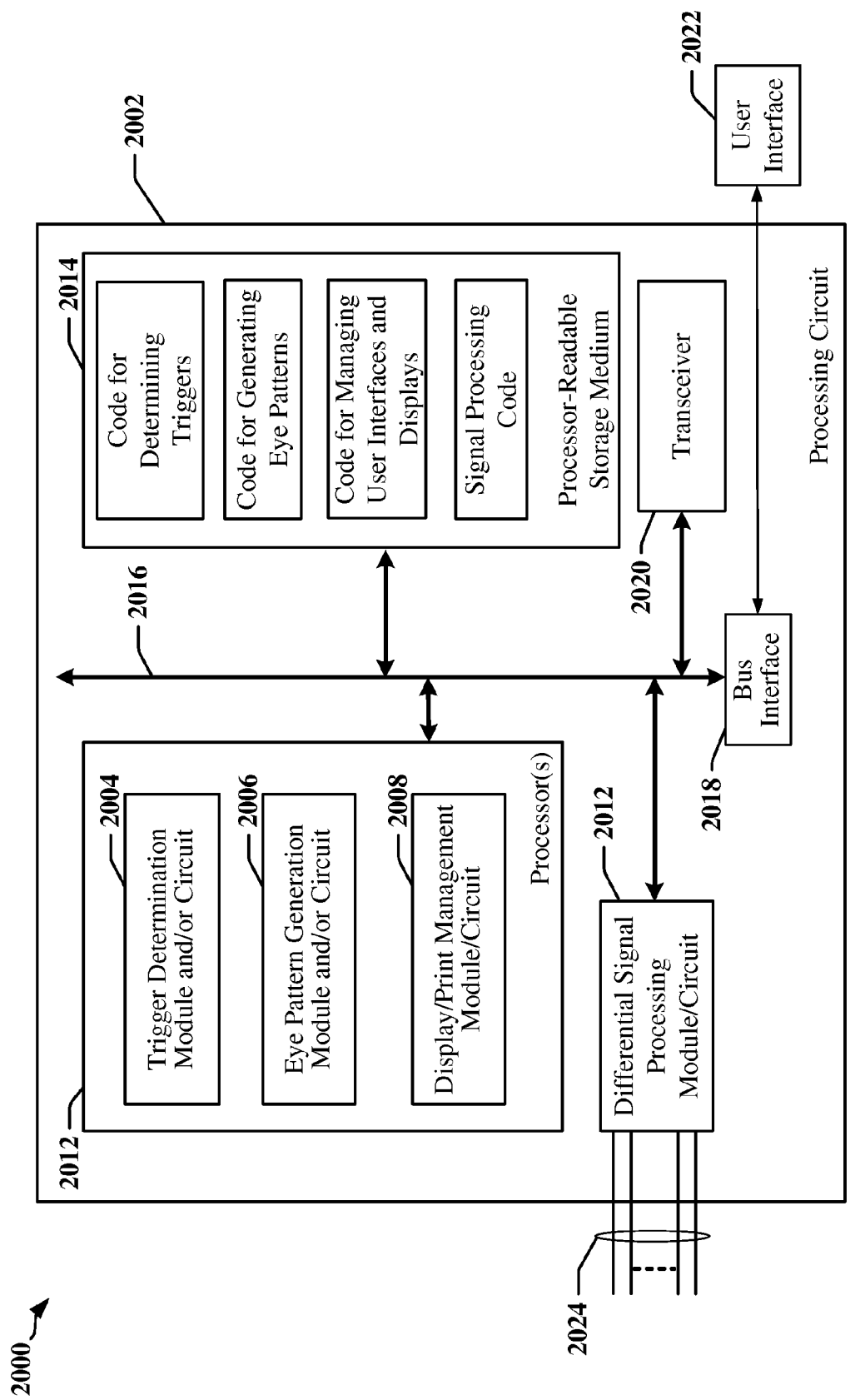
FIG. 20 illustrates one example of an apparatus configured to generate an eye pattern according to certain aspects disclosed herein.

FIG. 20 is a conceptual diagram illustrating an example of a hardware implementation for an apparatus 2000 employing a processing circuit 2002. In this example, the processing circuit 2002 may be implemented with a bus architecture, represented generally by the bus 2016. The bus 2016 may include any number of interconnecting buses and bridges depending on the specific application of the processing circuit 2002 and the overall design constraints. The bus 2016 links together various circuits including one or more processors, represented generally by the processor 2012, and computer-readable media, represented generally by the processor-readable storage medium 2014. The bus 2016 may also link various other circuits such as timing sources, timers, peripherals, voltage regulators, and power management circuits. A bus interface 2018 may provide an interface between the bus 2016 and user interface 2022. Depending upon the nature of the apparatus, the user interface 2022 may support and/or enable communications with a keypad, a display, a speaker, a microphone, a joystick, and user interface devices and/or systems. In some embodiments, a transceiver 2020 may be coupled to the bus 2016 directly, or through the bus interface circuit 2018. The transceiver 2020 may include an interface that provides a means for communicating with various other apparatus over a transmission medium. One or more clock generation circuits or modules may be provided within the processing circuit 2002 or controlled by processing circuit 2002 and/or one or more processors 2012. In one example, the clock generation circuits or modules may include one or more crystal oscillators, one or more phase-locked loop devices, and/or other such devices or circuits.

The processor 2012 is responsible for managing the bus 2016 and general processing, including the execution of software stored on the processor-readable storage medium 2014.

The software, when executed by the processor 2012, causes the processing circuit 2002 to perform the various functions described supra for any particular apparatus. The processor-readable storage medium 2014 may be used for storing data that is manipulated by the processor 2012 when executing software.

In one configuration, the processing circuit 2001 may include modules and/or circuits 2004 for determining a trigger corresponding to a first transition at a symbol boundary for each of a plurality of symbols received sequentially from the communications link, modules and/or circuits 2006 for generating and providing an image that superimposes representations of the plurality of symbols one upon another in an eye pattern, and presentation modules and/or circuits 2008 for displaying the image. The apparatus 2000 may additionally be provisioned with modules and/or circuits 2010 that are configured or adapted to receive, monitor and/or processing signals received from a set of connectors or wires 2024. In one example, the modules and/or circuits 2010 for receiving, monitoring and/or processing signals may be include comparison circuits configured to determine differences between combinations of signals received from the set of connectors or wires 2024 as illustrated, for example, in the clock generation circuit illustrated in FIG. 6.

In one example, the aforementioned processing circuit may be provided in a high-speed digital storage oscilloscope, which may include further software modules that are may be executed by one or more processors 2012 of the processing circuit 2002. When executed by the one or more processors 2012, the software modules may cause the processing circuit to generate one or more eye patterns 1504, 1604, 1700. For example, in order to produce one eye pattern 1604, the high-speed digital storage oscilloscope may capture and store many samples of voltages A, B, and C measured on wires 310*a*, 310*b*, 310*c* in high-speed waveform storage. The high-speed digital storage oscilloscope may be configured to compute A–B, B–C and C–A values and to find the first zero crossing at each UI boundary. The eye pattern 1504, 1604 and/or 1700 may be produced by displaying each segment of the A–B, B–C and C–A waveforms as an overlap with trigger points aligned in time.

Figure 21:
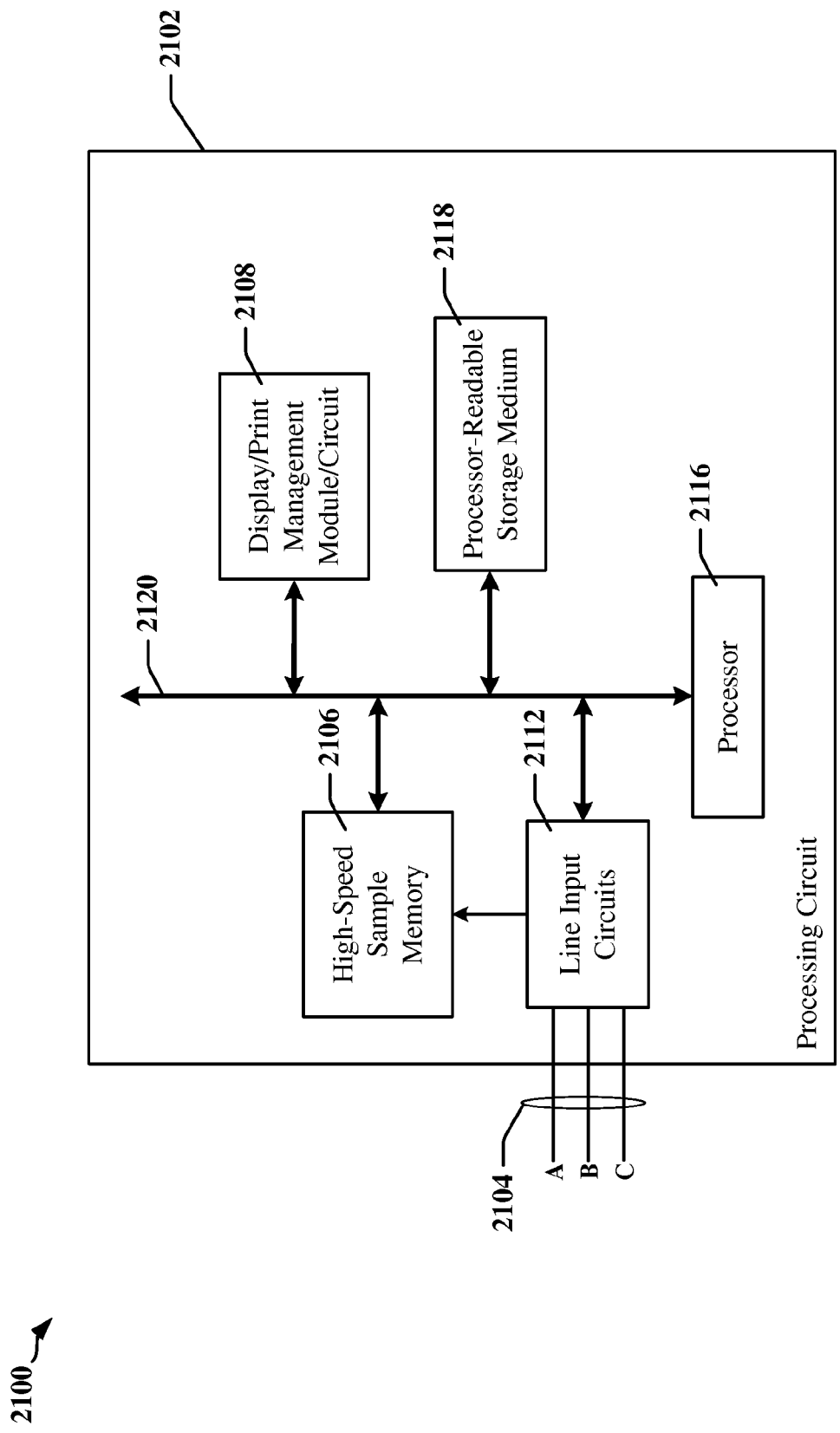
FIG. 21 illustrates an example of a test apparatus configured to generate an eye pattern according to certain aspects disclosed herein.

FIG. 21 is a block diagram 2100 illustrating a simplified example of a test and/or measurement apparatus such as a high-speed digital storage oscilloscope that may be configured to generate and display eye patterns for N-phase communications signals according to certain aspects disclosed herein. The apparatus can provide improved characterizations of communications links and channels over conventional test and measurement systems when multiple transitions are observed at a receiver.

The test and/or measurement apparatus may include a processing circuit 2102. The processing circuit 2102 may be implemented with a bus architecture, represented generally by the bus 2120. The bus 2120 may include any number of interconnecting buses and bridges depending on the specific application of the processing circuit 2102 and the overall design constraints. The bus 2120 links together various circuits including one or more processors and/or hardware modules, represented by the processor 2116, high-speed sample memory 2106, one or more modules or circuits 2108, line input circuits 2112 and the computer-readable storage medium 2118. The bus 2120 may also link various other circuits such as timing sources, peripherals, voltage regulators, and power management circuits, which are well known in the art, and therefore, will not be described any further.

The processor 2116 may include a microprocessor, a controller, a digital signal processor, a sequencer, a state machine, etc. The processor 2116 is responsible for general processing, including the execution of software stored on the computer-readable storage medium 2116. The software, when executed by the processor 2116, causes the processing circuit 2102 to perform the various functions described supra for any particular apparatus. The computer-readable storage medium 2118 may also be used for storing data that is manipulated by the processor 2116 when executing software. The processing circuit 2102 further includes at least one of the modules 2106 and 2108. The one or more modules 2108 may be software modules running in the processor 2116, resident/stored in the computer readable storage medium 2118, one or more hardware modules coupled to the processor 2116, or some combination thereof.

In one configuration, the line input circuits 2112 may receive and process signals from the communications link 2104. The inputs may be received using differential probes that generate difference signals for two or more wires. The line input circuits 2112 may digitize and/or measure voltages or currents of the wires of the communications link 2104. The processing circuit may be configured to calculate various properties of the wires, including difference voltages between pairs of the wires. A trigger corresponding to a first transition at a symbol boundary may be determined for each of a plurality of symbols received sequentially from the communications link. The processing circuit may include means 2108 for generating and providing an image that superimposes representations of the plurality of symbols one upon another in an eye pattern. The display and/or print management module or circuits 2108 may selectively generate the image on a sample point or first transition preceding or terminating the current symbol. The display and/or print management module or circuits 2108 may selectively generate a sunglasses image as illustrated in FIG. 17, for example.

In one example, a high-speed digital storage oscilloscope may include a combination of hardware and software modules configured to generate one or more eye patterns 1504, 1604, 1700. For example, in order to produce one eye pattern 1604, the high-speed digital storage oscilloscope may capture and store many samples of voltages A, B, and C measured on wires 310*a*, 310*b*, 310*c* (see FIG. 6) in high-speed waveform storage. The high-speed digital storage oscilloscope may be configured to compute A–B, B–C and C–A values and to find the first zero crossing at each UI boundary. The eye pattern 1504, 1604 and/or 1700 may be produced by displaying each segment of the A–B, B–C and C–A waveforms as an overlap with trigger points aligned in time.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for analyzing a communications link, comprising:
    using a sampling clock to generate one or more triggers for each symbol in a plurality of symbols received from the communications link, wherein the sampling clock is generated by a receiver of the plurality of symbols from transitions between consecutive symbols in the plurality of symbols, and wherein the receiver generates an edge in the sampling clock independently for each symbol in the plurality of symbols;
    determining a trigger corresponding to a first-occurring transition at a symbol boundary for each of the plurality of symbols; and
    generating an image comprising superimposed representations of the plurality of symbols, wherein the representations are arranged with respect to one another in the image by temporally aligning the triggers corresponding to the plurality of symbols,
    wherein the sampling clock is generated to capture data communicated in the plurality of symbols.

2. The method of claim 1, wherein the symbol boundary occurs at an end of the each symbol.

3. The method of claim 1, wherein the symbol boundary occurs at a beginning of the each symbol.

4. The method of claim 1, wherein generating the image comprises:
    superimposing representations of a series of sequential symbol pairs using a trigger that is derived from a first signal zero crossing occurring between a first symbol and a second symbol of each symbol pair in the series of sequential symbol pairs; and
    generating an eye pattern based on the superimposed representations.

5. The method of claim 1, wherein the first-occurring transition corresponds to a zero-crossing in a difference signal representative of a difference between states of two wires in the communications link.

6. The method of claim 5, wherein the zero-crossing is a first-occurring zero-crossing in a plurality of difference signals, each difference signal representing a difference measured between states of two wires of the communications link.

7. The method of claim 5, wherein the communications link comprises an M-wire, N-phase communications link or an N-factorial communications link.

8. The method of claim 5, wherein the communications link comprises a 3-wire, 3-phase communications link.

9. The method of claim 1, wherein each trigger is correlated with a sample point at which data is available for sampling in a delayed version of the symbol.

10. An apparatus, comprising:
    means for using a sampling clock to generate one or more triggers for each symbol in a plurality of symbols received from a communications link, wherein the sampling clock is generated by a receiver of the plurality of symbols from transitions between consecutive symbols in the plurality of symbols, and wherein the receiver generates an edge in the sampling clock independently for each symbol in the plurality of symbols;
    means for determining a trigger corresponding to a first-occurring transition at a symbol boundary for each of the plurality of symbols; and
    means for generating an image comprising superimposed representations of the plurality of symbols, wherein the representations are arranged with respect to one another in the image by temporally aligning triggers corresponding to the plurality of symbols,
    wherein the sampling clock is generated to capture data communicated in the plurality of symbols.

11. The apparatus of claim 10, wherein the symbol boundary occurs at an end of the each symbol.

12. The apparatus of claim 10, wherein the means for generating the image is configured to superimpose representations of a series of sequential symbol pairs using a trigger that is derived from a first signal zero crossing occurring between a first symbol and a second symbol of each symbol pair in the series of sequential symbol pairs.

13. The apparatus of claim 10, wherein the first-occurring transition corresponds to a zero-crossing in a difference signal representative of a difference between states of two wires in the communications link.

14. The apparatus of claim 13, wherein the zero-crossing is a first-occurring zero-crossing in a plurality of difference signals corresponding to different pairs of wires of the communications link.

15. The apparatus of claim 10, wherein each trigger is correlated with a sample point at which data is available for sampling in a delayed version of the symbol.

16. An apparatus, comprising:
    clock recovery logic configured to generate a sampling clock from transitions between consecutive symbols in a plurality of symbols received from a communications link, wherein the clock recovery logic generates an edge in the sampling clock independently for each symbol in the plurality of symbols; and
    a processing circuit configured to:
        use the sampling clock to generate one or more triggers for each symbol in the plurality of symbols;
        determine a trigger corresponding to a first-occurring transition at a symbol boundary for each of the plurality of symbols; and
        generate an image comprising superimposed representations of the plurality of symbols, wherein the representations are arranged with respect to one another in the image by temporally aligning triggers corresponding to the plurality of symbols,
    wherein the sampling clock is generated to capture data communicated in the plurality of symbols.

17. The apparatus of claim 16, wherein the symbol boundary occurs at an end of the each symbol.

18. The apparatus of claim 16, wherein the processing circuit configured to:
    superimpose representations of a series of sequential symbol pairs using a trigger that is derived from a first signal zero crossing occurring between a first symbol and a second symbol of each symbol pair in the series of sequential symbol pairs; and
    generate an eye pattern based on the superimposed representations.

19. The apparatus of claim 16, wherein the first-occurring transition corresponds to a zero-crossing in a difference signal representative of a difference between states of two wires in the communications link.

20. The apparatus of claim 19, wherein the zero-crossing is a first-occurring zero-crossing in a plurality of difference signals corresponding to different pairs of wires of the communications link.

21. The apparatus of claim 16, wherein each trigger is correlated with a sample point at which data is available for sampling in a delayed version of the symbol.

22. A non-transitory processor-readable storage medium having one or more instructions which, when executed by at least one processing circuit, cause the at least one processing circuit to:
use a sampling clock to generate one or more triggers for each symbol in a plurality of symbols received from a communications link, wherein the sampling clock is generated by a receiver of the plurality of symbols from transitions between consecutive symbols in the plurality of symbols, where the receiver generates an edge in the sampling clock independently for each symbol in the plurality of symbols;
determine a trigger corresponding to a first-occurring transition at a symbol boundary for each of the plurality of symbols; and
generate an image comprising superimposed representations of the plurality of symbols, wherein the representations are arranged with respect to one another in the image by temporally aligning triggers corresponding to the plurality of symbols,
wherein the sampling clock is generated to capture data communicated in the plurality of symbols.

23. The storage medium of claim 22, wherein the symbol boundary occurs at an end of the each symbol.

24. The storage medium of claim 22, wherein the symbol boundary occurs at a beginning of the each symbol.

25. The storage medium of claim 22, wherein the instructions cause the at least one processing circuit to:
superimpose representations of a series of sequential symbol pairs using a trigger that is derived from a first signal zero crossing occurring between a first symbol and a second symbol of each symbol pair in the series of sequential symbol pairs; and
generate an eye pattern based on the superimposed representations.

26. The storage medium of claim 22, wherein the first-occurring transition corresponds to a zero-crossing in a difference signal representative of a difference between states of two wires in the communications link.

27. The storage medium of claim 26, wherein the zero-crossing is a first-occurring zero-crossing in a plurality of difference signals, each difference signal representing a difference measured between states of two wires of the communications link.

28. The storage medium of claim 26, wherein the communications link comprises an M-wire, N-phase communications link or an N-factorial communications link.

29. The storage medium of claim 26, wherein the communications link comprises a 3-wire, 3-phase communications link.

30. The storage medium of claim 22, wherein each trigger is correlated with a sample point at which data is available for sampling in a delayed version of the symbol.

\* \* \* \* \*